(12) United States Patent
Flynn

(10) Patent No.: US 10,246,342 B2
(45) Date of Patent: Apr. 2, 2019

(54) CENTRIFUGAL ALUMINUM CHLORIDE GENERATOR

(71) Applicant: Tronox LLC, Oklahoma City, OK (US)

(72) Inventor: Harry E Flynn, Edmond, OK (US)

(73) Assignee: Tronox LLC, Oklahoma City, OK (US)

( * ) Notice: Subject to any disclaimer, the term of this patent is extended or adjusted under 35 U.S.C. 154(b) by 49 days.

(21) Appl. No.: 15/471,922

(22) Filed: Mar. 28, 2017

(65) Prior Publication Data

US 2017/0283273 A1     Oct. 5, 2017

Related U.S. Application Data

(60) Provisional application No. 62/316,112, filed on Mar. 31, 2016.

(51) Int. Cl.
| | |
|---|---|
| *C01G 23/00* | (2006.01) |
| *C01G 23/07* | (2006.01) |
| *B01J 8/08* | (2006.01) |
| *C01G 23/02* | (2006.01) |

(52) U.S. Cl.
CPC .............. *C01G 23/07* (2013.01); *B01J 8/08* (2013.01); *C01G 23/022* (2013.01); *B01J 2208/00752* (2013.01); *B01J 2208/00761* (2013.01)

(58) Field of Classification Search
CPC ........... C01G 23/07; C01G 23/022; B01J 8/08
See application file for complete search history.

(56) References Cited

U.S. PATENT DOCUMENTS

| | | |
|---|---|---|
| 1,619,022 A | 3/1927 | Hall |
| 3,343,911 A | 9/1967 | Eisenlohr |
| 3,446,579 A | 5/1969 | Toomey et al. |
| 3,542,521 A | 11/1970 | Kulling et al. |
| 4,080,194 A | 3/1978 | Fey |
| 5,413,813 A | 5/1995 | Cruse et al. |
| 5,599,519 A | 2/1997 | Haddow |
| 5,683,669 A | 11/1997 | Hartmann et al. |
| 7,854,917 B2 | 12/2010 | Flynn et al. |
| 8,324,523 B2 | 12/2012 | Foret |
| 8,617,672 B2 | 12/2013 | Bhatnagar et al. |
| 8,691,167 B2 | 4/2014 | Flynn |
| 2008/0274040 A1 | 11/2008 | Flynn et al. |

FOREIGN PATENT DOCUMENTS

EP     0583063 B1     9/1999

OTHER PUBLICATIONS

International Search Report and Written Opinion dated Aug. 21, 2017 in corresponding international application PCT/US17/24706, Tronox LLC.
Office Action dated Sep. 12, 2018 in corresponding Taiwan application No. 106110987, with English translation, Tronox LLC.

*Primary Examiner* — James A Fiorito
(74) *Attorney, Agent, or Firm* — McAfee & Taft

(57) ABSTRACT

A metal chloride generator is provided. The metal chloride generator is a metal chloride centrifugal reactor that can be operated under conditions sufficient to cause metal particles and chlorine in the generator to be brought into contact with one another and react using centrifugal force to form metal chloride. A process for manufacturing titanium dioxide that utilizes the metal chloride generator is also provided.

19 Claims, 14 Drawing Sheets

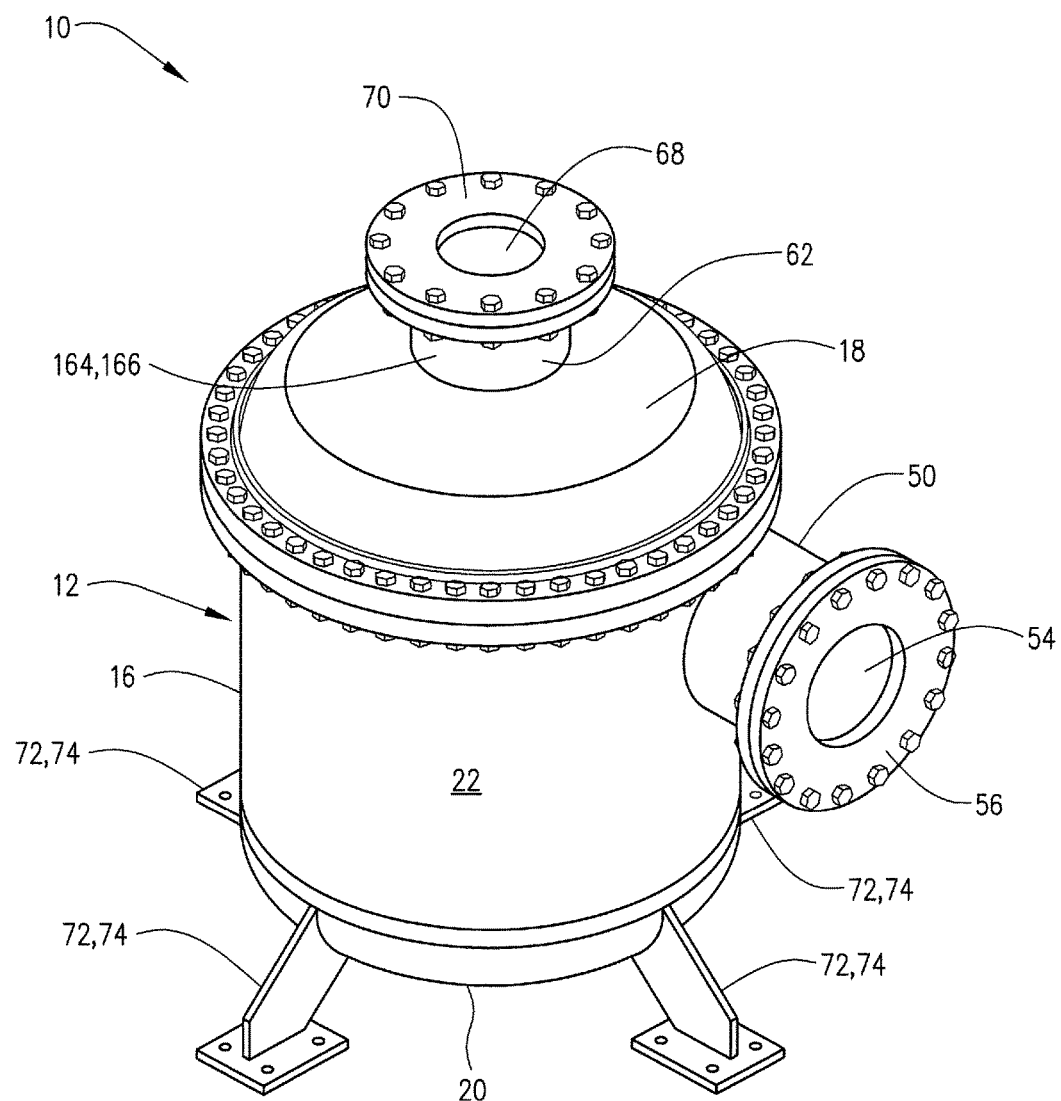

Pressure Contour (Pa)
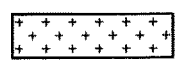 7.258e+004
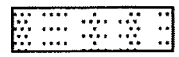 7.123e+004
 6.921e+004
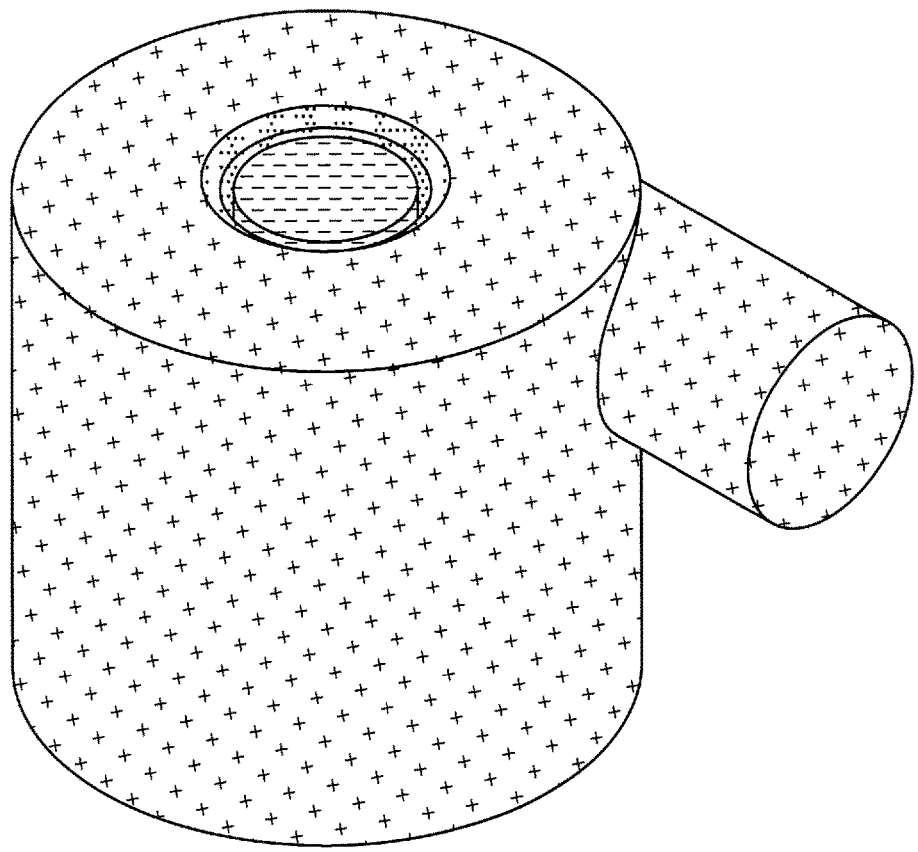
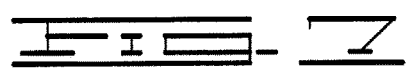
FIG-7

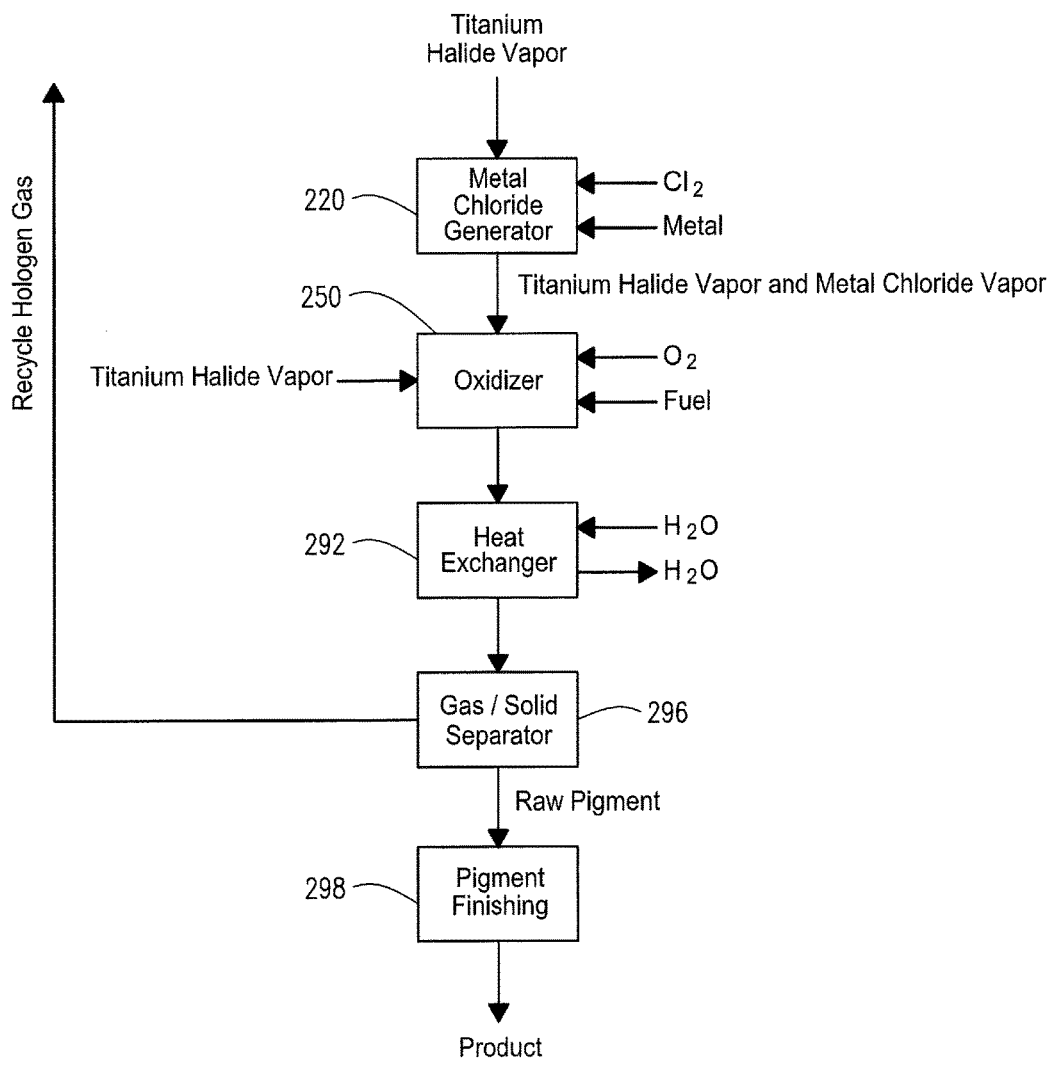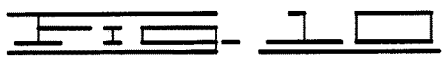

CENTRIFUGAL ALUMINUM CHLORIDE GENERATOR

CROSS-REFERENCE TO RELATED APPLICATIONS

This application claims the benefit of prior-filed U.S. provisional application No. 62/316,112 (filed on Mar. 31, 2016), which is incorporated by reference herein.

BACKGROUND

Titanium dioxide is a well-known pigment and white opacifying agent. For example, titanium dioxide is used as a pigment in connection with coating formulations (including paint and ink formulations), paper compositions, polymer compositions and other products. Titanium dioxide pigments can be manufactured by either the sulfate process or the chloride process. Regardless of the manufacturing process used, the pigments are typically produced in powder form.

In the chloride process for manufacturing titanium dioxide, a dry titanium dioxide ore (for example, rutile or high-grade ilmenite) is fed into a chlorinator together with a carbon source (for example, coke) and chlorine and reacted at a high temperature to produce titanium tetrachloride ($TiCl_4$) in vapor form. The gaseous titanium tetrachloride is condensed into liquid form and then purified to remove impurities therefrom. The purified titanium tetrachloride is then vaporized and reacted with oxygen in the vapor phase at a high temperature to produce titanium dioxide particles and gaseous reaction products. In order to achieve the necessary high temperature in the oxidizer, the titanium tetrachloride vapor and oxygen gas stream are usually preheated before being introduced into the oxidizer. Following the oxidation step, the titanium dioxide and gaseous reaction products are cooled and the titanium dioxide particles are recovered.

The recovered titanium dioxide particles are usually further processed before being sold and transported for use as a pigment. For example, depending on the anticipated end use application, the finishing process typically entails coating the titanium dioxide particles with one or more metal oxides to enhance the light scattering efficiency and durability of the pigment and impart other desired properties and characteristics thereto.

A metal chloride such as aluminum chloride is typically added to the titanium tetrachloride vapor in the oxidation reactor to incorporate a metal oxide into the crystalline lattice structure of the titanium dioxide. The metal oxide promotes rutilization of the titanium dioxide. It also enhances the durability of the finished pigment.

Metal chloride for use in a titanium halide vapor phase oxidation process is generally obtained in one of two ways: 1) by purchasing it from a commercial vendor; or 2) by generating it in situ. Each way has its advantages and disadvantages.

For example, pre-existing (e.g., purchased) metal chloride does not require the expense of the equipment necessary for generating the metal chloride in situ. However, pre-existing (e.g., purchased) metal chloride must first be dissolved into the condensed liquid titanium halide. This typically requires the titanium halide to be heated. The dissolution process can lengthen the time of the overall production cycle. Also, a commercial grade, pre-existing metal chloride such as aluminum chloride can contain impurities that react with the titanium halide and produce problematic deposits on the walls of the titanium halide vaporizer. Further, the mixture of the metal chloride and the titanium halide can be corrosive, which typically requires the oxidation reactor and related equipment to be lined with costly corrosion-resistant material.

The aluminum chloride can be generated in situ by various methods. For example, the metal chloride (for example, aluminum chloride) can be generated in a fluid bed reactor. In such a reactor, for example, a mixed stream of chlorine gas and titanium halide vapor from the vaporizer or preheater (depending on the sequence in which such equipment is used) can be introduced into a bed of solid metal (for example, solid aluminum) pellets in the bottom of the reactor and caused to flow vertically in the form of bubbles and interstitial gas. The bubbles and interstitial gas contact the metal pellets which cause the chlorine and metal to react to form metal chloride vapor. Blow over solid metal (for example, solid aluminum) particles can exit the fluid bed reactor as blow over. A sand bed is also typically included in the reactor in order to scour the surface of the aluminum or other metal pellets to break an aluminum oxide or other metal oxide coating that is generally inherently on the surfaces of the pellets.

The size of a fluid bed metal chloride generator is generally determined by the size of the metal particles allowed to exit the reactor as blow over and the exothermicity of the reaction between the metal and chlorine. The desired blow over metal particle size dictates the space velocity and transport disengagement height of the fluid bed. Usually, the particle size is chosen to be relatively small due to concerns of erosion and corrosion of downstream equipment. For example, the reaction of aluminum and chlorine is so exothermic that at typical addition levels, virtually the entire titanium halide vapor stream is run through the fluid bed metal chloride generator to serve as a heat sink for the process to keep the reaction temperature under control as dictated by the melting point of aluminum. Due to the exothermic nature of the reaction, the overall rate of addition of the aluminum and chlorine to the reactor is also a factor in determining the size of the reactor needed.

Normally, in order to produce a sufficient amount of metal chloride to provide the desired concentration of metal oxide in the titanium dioxide pigment, the fluid bed reactor is fairly large. A decrease in the particle size of the metal generally means an increase in the size of the reactor required. For example, in many cases, a fluid bed metal chloride generator on a titanium dioxide production line will be 16 feet in height and over three feet in diameter. Due to the corrosive nature of a titanium halide and metal chloride mixture, the reactor must generally be made of exotic alloys and be refractory lined. As a result, large fluid bed reactors can be costly due to capital, operational and maintenance costs.

SUMMARY

In accordance with the present disclosure, a metal chloride generator is provided. The metal chloride generator is a metal chloride centrifugal reactor. In one embodiment, the metal chloride generator disclosed herein comprises:
  a. a reactor housing, the reactor housing including an inside surface, an outside surface, a top portion, a bottom portion, a sidewall connecting the top portion and the bottom portion together, and an interior;
  b. a cylindrical reaction chamber positioned within the interior of the reactor housing, the reaction chamber including an inside surface, an outside surface, a top, a bottom, a cylindrical side wall connecting the top and the bottom together and an interior, the interior of the reaction chamber having a top half and a bottom half;

c. a reactant inlet conduit extending through the sidewall of the reactor housing and the sidewall of the reaction chamber and including an inside surface, an outside surface and an interior, the reactant inlet conduit also including a first opening for receiving at least one reaction component from a location outside of the reactor housing and a second opening for discharging the reaction component into the reaction chamber, the second opening of the reactant inlet conduit being flush with the inside surface of the cylindrical sidewall of the reaction chamber and opening into the interior of the reaction chamber, and d. a reaction product outlet conduit extending through the top of the reaction chamber and the top of the reactor housing and including an inside surface, an outside surface and an interior, the reaction product outlet conduit also including a first opening for receiving at least one reaction product from the interior of the reaction chamber and a second opening for discharging the reaction product to a location outside of the reactor housing.

In another embodiment of the metal chloride generator, at least one of the reaction chamber, the reactant inlet conduit, and the reaction product outlet conduit includes a refractory lining attached to the inside surface thereof, the refractory lining having an inside surface facing the interior of the reaction chamber, reactant inlet conduit or reaction product outlet conduit that has a texture rough enough to break metal oxide layers on the metal particles.

In accordance with the present disclosure, a process for manufacturing titanium dioxide is also provided. In a first embodiment, the process is a chloride process for manufacturing titanium dioxide, comprising:

a. introducing titanium dioxide ore, a carbon source and chlorine into a chlorinator;

b. operating the chlorinator under conditions sufficient to cause titanium dioxide ore, the carbon source and chlorine in the chlorinator to react to form titanium tetrachloride;

c. introducing metal particles and chlorine into a metal chloride generator, wherein the metal chloride generator is a metal chloride centrifugal reactor;

d. operating the metal chloride generator under conditions sufficient to cause metal particles and chlorine in the generator to be brought into contact with one another and react using centrifugal force to form metal chloride;

e. introducing titanium tetrachloride formed in the chlorinator, metal chloride formed in the metal chloride generator and oxygen into an oxidizer;

f. operating the oxidizer under conditions sufficient to oxidize titanium tetrachloride and metal chloride in the oxidizer to form titanium dioxide particles having a metal oxide incorporated into their crystalline lattice structure; and g. recovering titanium dioxide particles formed in the oxidizer.

In a second embodiment, the process is a process for manufacturing titanium dioxide, comprising:

a. introducing metal particles and chlorine into a metal chloride generator, wherein the metal chloride generator is a metal chloride centrifugal reactor;

b. operating the metal chloride generator under conditions sufficient to cause metal particles and chlorine in the generator to be brought into contact with one another and react using centrifugal force to form metal chloride;

c. introducing titanium halide, metal chloride formed in the metal chloride generator and oxygen into an oxidizer;

d. operating the oxidizer under conditions sufficient to oxidize titanium halide and metal chloride in the oxidizer to form titanium dioxide particles having a metal oxide incorporated their crystalline lattice structure; and e. recovering titanium dioxide particles formed in the oxidizer.

BRIEF DESCRIPTION OF THE DRAWINGS

The drawings included with this application illustrate certain aspects of the embodiments described herein. However, the drawings should not be viewed as exclusive embodiments. The subject matter disclosed is capable of considerable modifications, alterations, combinations, and equivalents in form and function, as will occur to those skilled in the art with the benefit of this disclosure.

FIG. 1 is a perspective view of one embodiment of the centrifugal aluminum chloride generator disclosed herein.

FIGS. 5-8 illustrate the results of a computational fluid dynamics (CFD) analysis carried out with respect to the aluminum chloride generator illustrated by FIGS. 1-3 and 4A-4C.

FIG. 10 is a schematic diagram illustrating another embodiment of the process for manufacturing titanium dioxide disclosed herein.

DETAILED DESCRIPTION

Figure 2A:
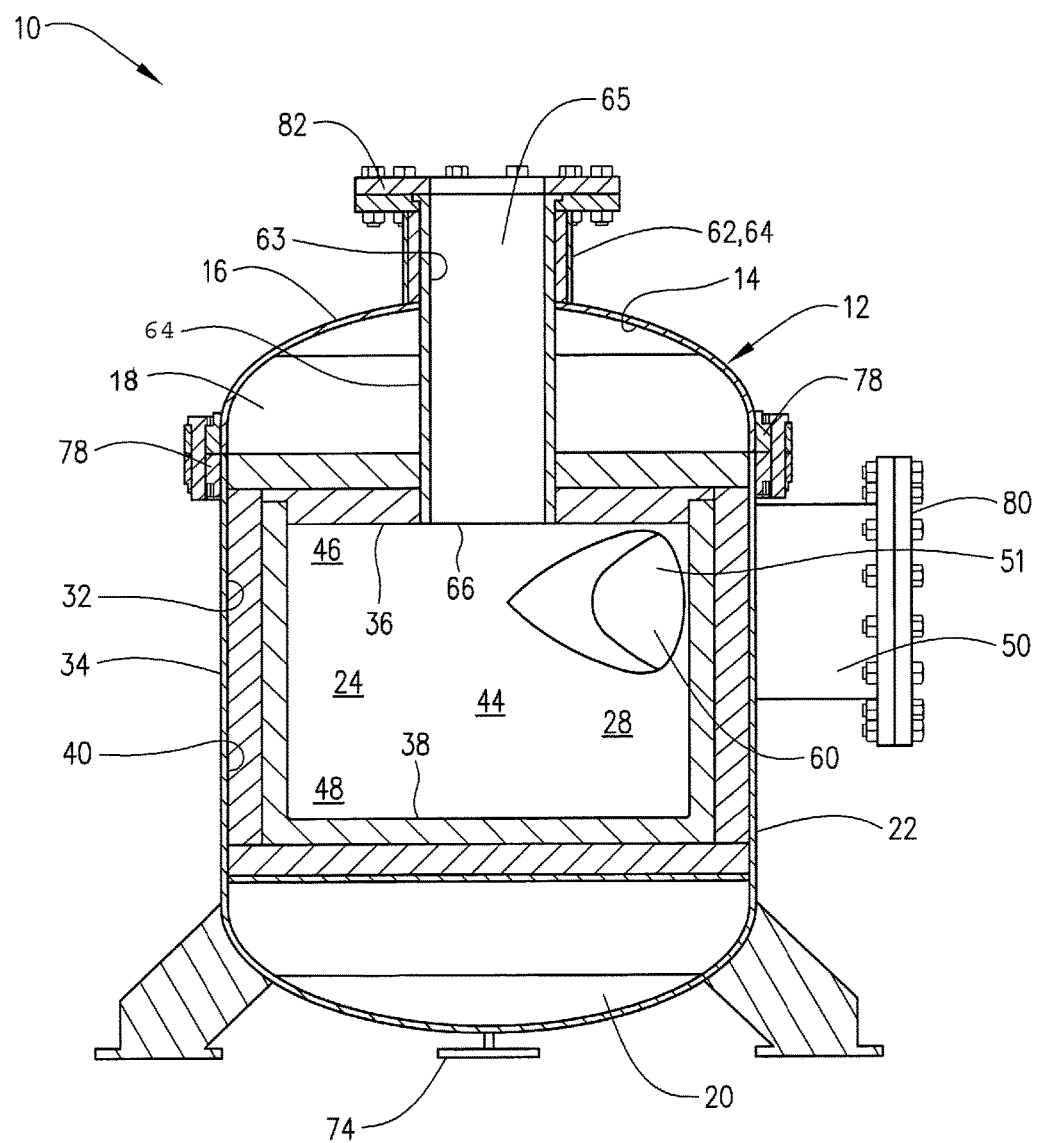
FIG. 2A is a partial sectional view of the centrifugal aluminum chloride generator illustrated by FIG. 1 with a top inlet and a without a central vortex finder.

The present disclosure may be understood more readily by reference to this detailed description. For simplicity and clarity of illustration, where appropriate, reference numerals may be repeated among the different figures to indicate corresponding or analogous elements. In addition, numerous specific details are set forth in order to provide a thorough understanding of the various embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

In one aspect, the present disclosure provides a metal chloride generator. In another aspect, the present disclosure provides a process for manufacturing titanium dioxide.

The metal chloride generator disclosed herein is a metal chloride centrifugal reactor. As used herein and in the appended claims, a metal chloride centrifugal reactor means a reactor that uses centrifugal forces to facilitate the reaction of a solid metal and chlorine gas to form a metal chloride, and to separate the metal chloride from other components in the reactor. The centrifugal forces allow the chlorine gas and solid metal particles to react while preventing small unreacted metal particles in the generator from being carried out of the reactor as blow over. The metal chloride generator can be used as a stand alone metal chloride generator or can be used in situ in any process in which a metal chloride is needed. As used herein and in the appended claims, "attached to" a surface or component means attached, directly or indirectly, to the surface or component.

In one embodiment, the metal chloride generator disclosed herein is for use in generating metal chloride in situ in a process for manufacturing titanium dioxide. For example, the metal chloride generator can be used to circumvent the size constraints and design parameters associated with conventional fluidized bed reactors currently used to generate metal chlorides in situ in a chloride process for manufacturing titanium dioxide.

Referring now to the drawings, and particularly to FIGS. 1-4, one embodiment of the metal chloride generator of the present disclosure, generally designated by the reference number 10, will be described. The metal chloride generator 10 comprises:

a. a reactor housing 12, the reactor housing including an inside surface 14, an outside surface 16, a top portion 18, a bottom portion 20, a sidewall 22 connecting the top portion 18 and the bottom portion 20, and an interior 24;

b. a cylindrical reaction chamber 28 positioned within the interior 24 of the reactor housing 12, the reaction chamber 28 including an inside surface 32, an outside surface 34, a top 36, a bottom 38, a cylindrical sidewall 40 connecting the top 36 and the bottom 38 together and an interior 44, the interior 44 of the reaction chamber 28 having a top half 46 and a bottom half 48;

c. a reactant inlet conduit 50 extending through the sidewall 22 of the reactor housing 12 and the sidewall 40 of the reaction chamber 28 and including an inside surface 51, an outside surface 52 and an interior 53, the reactant inlet conduit 50 also including a first opening 54 for receiving at least one reaction component from a location 56 outside of the reactor housing 12, and a second opening 60 for discharging the reaction component into the reaction chamber 28, the second opening 60 of the reactant inlet conduit 50 being flush with the inside surface 32 of the cylindrical sidewall 40 of the reaction chamber 28 and opening into the interior 44 of the reaction chamber 28; and d. a reaction product outlet conduit 62 extending through the top 36 of the reaction chamber 28 and the top portion 18 of the reactor housing 12 and including an inside surface 63, an outside surface 64 and an interior 65, the reaction product outlet conduit 62 including a first opening 66 for receiving at least one reaction product from the interior 44 of the reaction chamber 28 and a second opening 68 for discharging the reaction product to a location 70 outside of the reactor housing.

The reactor housing 12 is cylindrical in shape and supported on the ground by a stand assembly 72. The stand assembly 72 supports the metal chloride generator 10 on the ground or other surface (not shown). The stand assembly 72 includes a plurality of leg members 74. A pair of opposing flange assemblies 78 are attached to the outside surface 16 of the reactor housing 12 adjacent to the top portion 18 and the sidewall 22 of the reactor housing 12 for allowing the top portion 18 to be removed from the reactor housing 12. The removable top portion 18 of the reactor housing 12 allows access to the interior 44 of the reaction chamber 12.

A corrosion-resistant liner 84 having an inside surface 86 and an outside surface 88 is attached to the reactor housing 12. The outside surface 88 of the corrosion-resistant liner 84 is attached to the inside surface 14 of the reactor housing 12.

The cylindrical reaction chamber 28 is cylindrical in shape and positioned in a center portion 90 of the reactor housing 12. The inside surface 32 of the reaction chamber 28 is surrounded by a refractory lining 92 that has an inside surface 94 and an outside surface 96. The inside surface 94 of the refractory lining 92 faces the interior 44 of the reaction chamber 28.

The refractory lining 92 is surrounded by an insulation layer 100, which includes an inside surface 102 and an outside surface 104, a sidewall 106, a top 108 and a bottom 110. The inside surface 102 of the insulation layer 100 is attached to the outside surface 96 of the refractory lining 92. For example, the outside surface 104 of the sidewall 106 of the insulation layer 100 is attached to the inside surface 86 of the corrosion-resistant liner 84.

The reactant inlet conduit 50 is a cylindrical conduit. The inside surface 51 of the reactant inlet conduit 50 is surrounded by a refractory lining 120 that has an inside surface 122 and an outside surface 124. The inside surface 122 of the refractory lining 120 faces the interior 53 of the reactant inlet conduit 50.

Figure 4A:
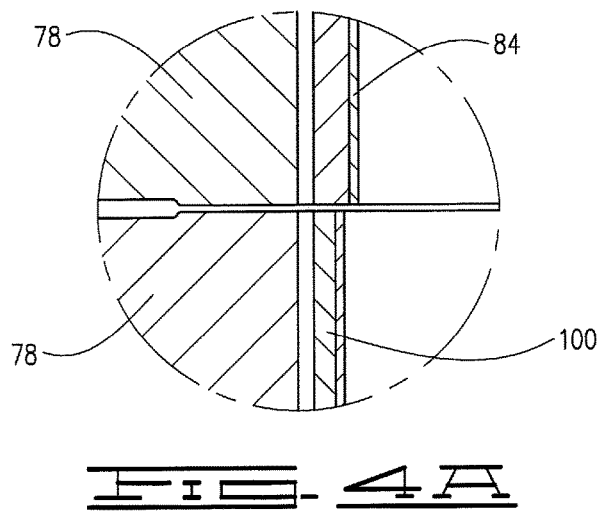
FIG. 4A is a detail view taken from section 4A of FIG. 3.
Figures 4B, 4C:
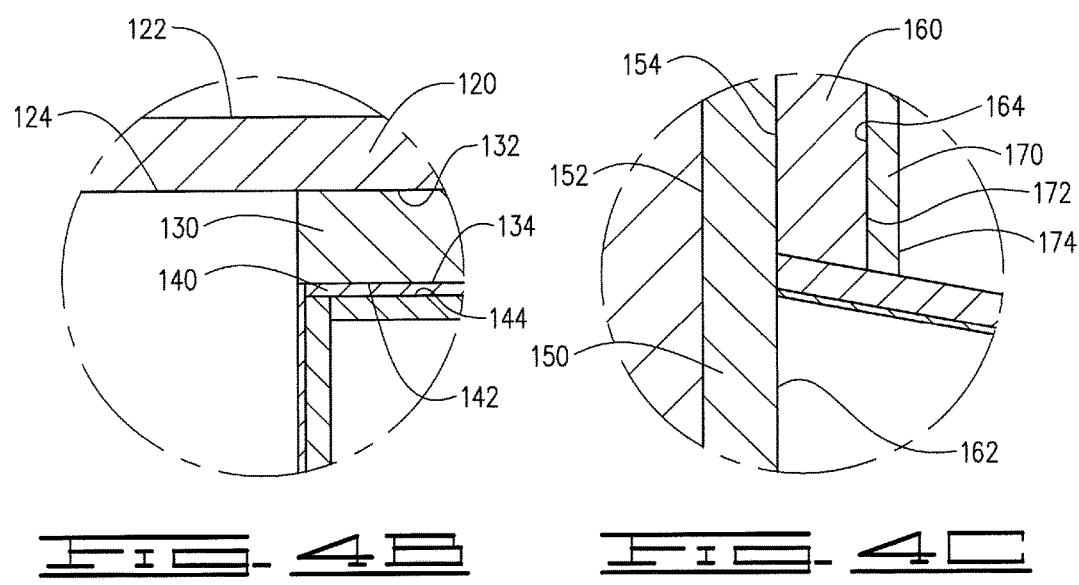
FIG. 4B is a detail view taken from section 4B of FIG. 3.
FIG. 4C is a detail view taken from section 4C of FIG. 2C.
Figure 5:
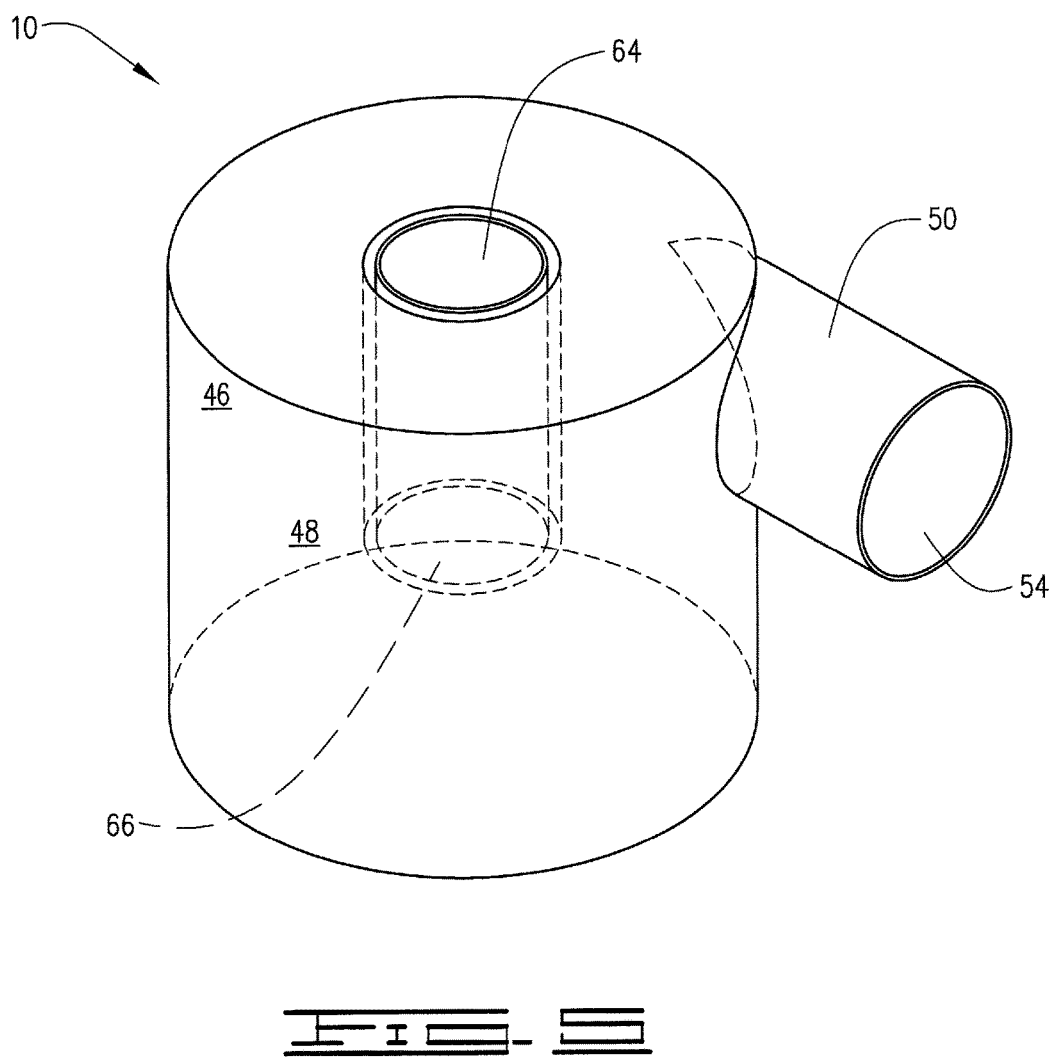
Figure 5:
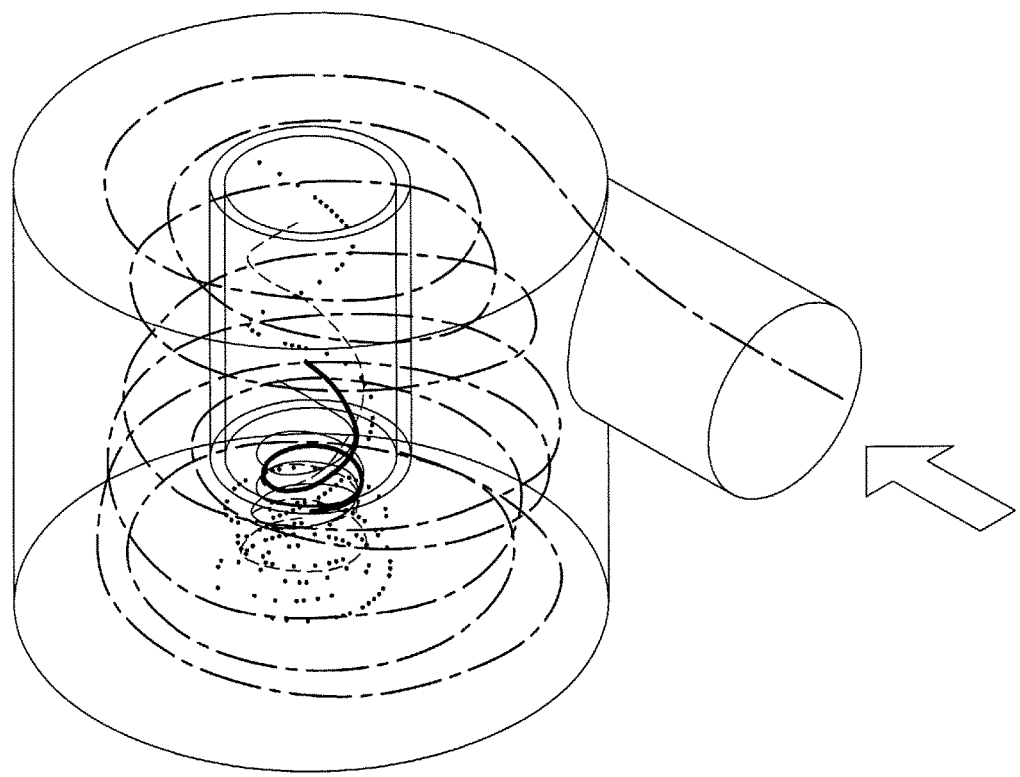

An insulation layer 130 having an inside surface 132 and an outside surface 134 surrounds the refractory lining 120. The inside surface 132 of the insulation layer 130 is attached to the outside surface 124 of the refractory lining 120. As best shown by FIG. 4B, a corrosion-resistant liner 140 having an inside surface 142 and an outside surface 144 surrounds the insulation layer 130. The inside surface 142 of the corrosion-resistant liner 140 is attached to the outside surface 134 of the insulation layer 130.

The reactant inlet conduit 50 receives at least one reaction component (for example, all of the reaction components) from a location 56 outside of the reactor housing 12 through the first opening 54 and discharges the reaction component (for example, all of the reaction components) through the second opening 60 into the reaction chamber 28. For example, the location 56 can be one or more other conduits (not shown) fluidly connected to sources of the reaction products (not shown). A flange 80 can be used to connect the reactant inlet conduit 50 to another conduit.

As shown by FIGS. 1, 2A, 2B, 2C and 3, the second opening 60 of the reactant inlet conduit 50 opens into the top half 46 of the interior 44 of the reaction chamber 28. In another embodiment, as shown by FIGS. 2D and 2E, the second opening 60 of the reactant inlet conduit 50 opens into the bottom half 48 of the interior 44 of the reaction chamber 28. For example, as shown by Example 1 below, it is better in some respects for the second opening 60 of the reactant inlet conduit 50 to open into the top half 46 of the interior 44 of the reaction chamber 28.

The reaction product outlet conduit 62 is also a cylindrical conduit. The reaction product outlet conduit 62 is surrounded by a refractory lining 150 that has an inside surface 152 and an outside surface 154. The inside surface 152 of the refractory lining 150 faces the interior 65 of the reactant inlet conduit 50.

An insulation layer 160 having an inside surface 162 and an outside surface 164 surrounds a portion 166 of the reaction product outlet conduit 62 adjacent the second opening 68 thereof. The inside surface 162 of the insulation layer 160 is attached to the outside surface 64 of the reaction product outlet conduit 62. As best shown by FIG. 4C, a corrosion-resistant liner 170 having an inside surface 172 and an outside surface 174 surrounds the insulation layer 160. The inside surface 172 of the corrosion-resistant liner 170 is attached to the outside surface 164 of the insulation layer 160.

The reaction product outlet conduit 62 receives at least one reaction product (for example, all of the reaction products) from the interior 44 of the reaction chamber 28 through the first opening 66 and discharges the reaction product (for example, all of the reaction products) through the second opening 68 to a location 70 outside of the reactor housing 12. For example, the location 70 can be one or more other conduits (not shown) for conducting the reaction product to other equipment (not shown) for further processing. A flange 82 can be used to connect the reaction product outlet conduit 62 to another conduit.

Figure 2B:
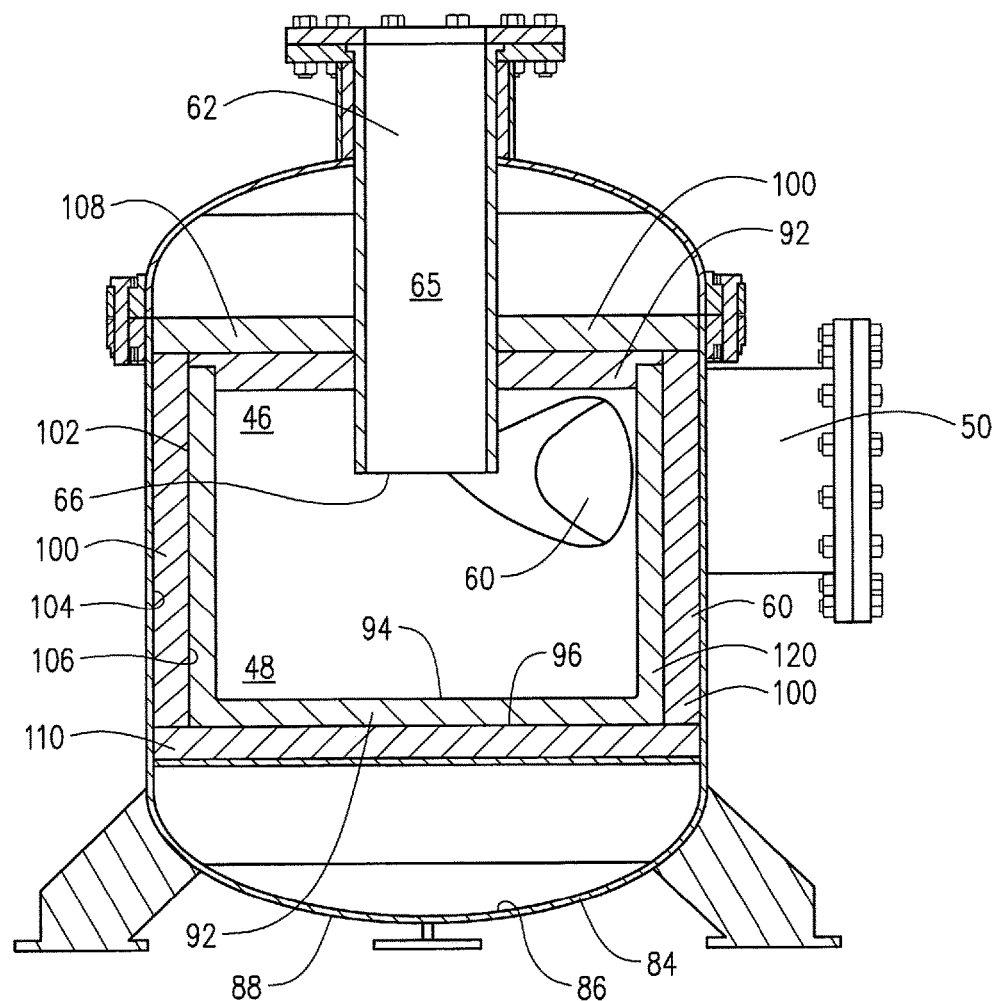
FIG. 2B is a partial sectional view of the centrifugal aluminum chloride generator illustrated by FIG. 1 with a top inlet and a central vortex finder extending a first distance from the top of the generator into the generator.
Figure 2C:
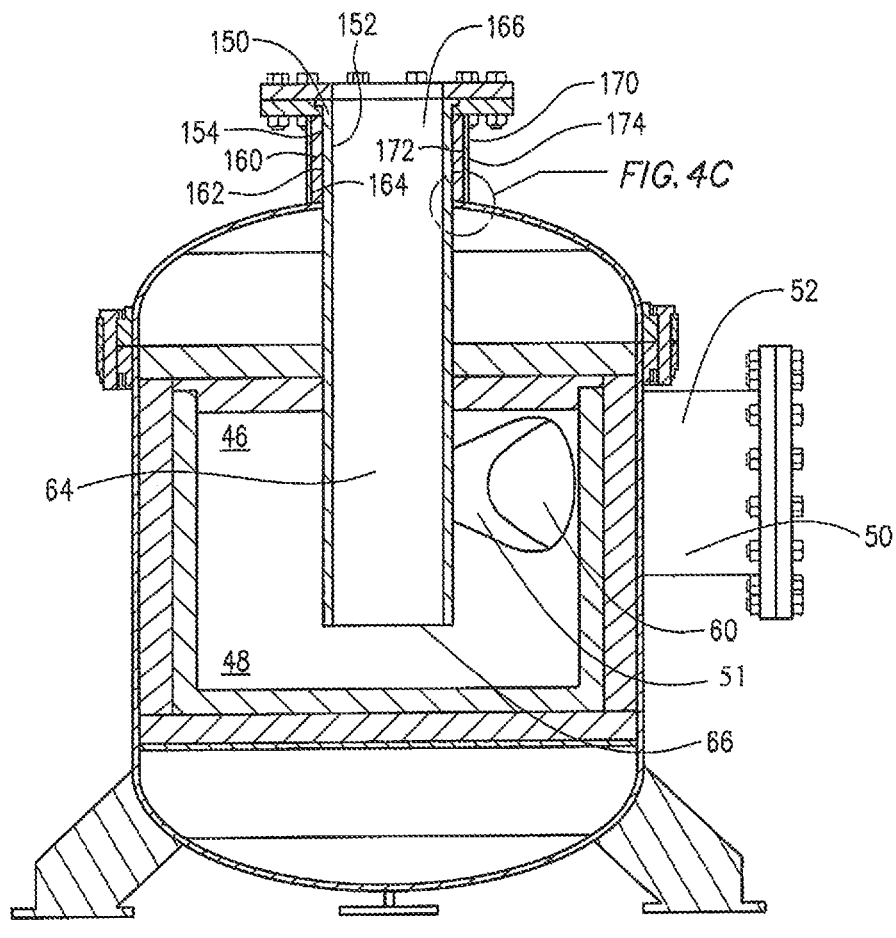
FIG. 2C is a partial sectional view of the centrifugal aluminum chloride generator illustrated by FIG. 1 with a top inlet and a central vortex finder extending a second distance from the top of the generator into the generator.
Figure 2D:
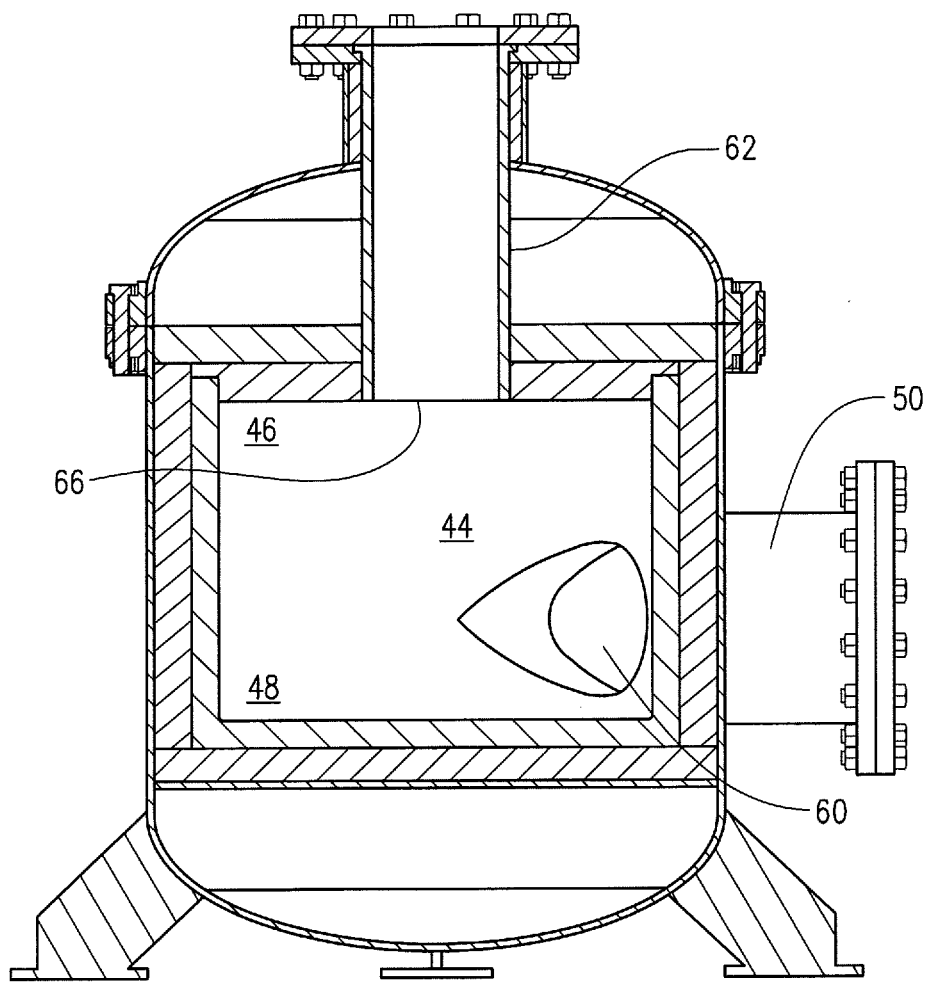
FIG. 2D is a partial sectional view of the centrifugal aluminum chloride generator illustrated by FIG. 1 with a bottom inlet and without a central vortex finder.
Figure 2E:
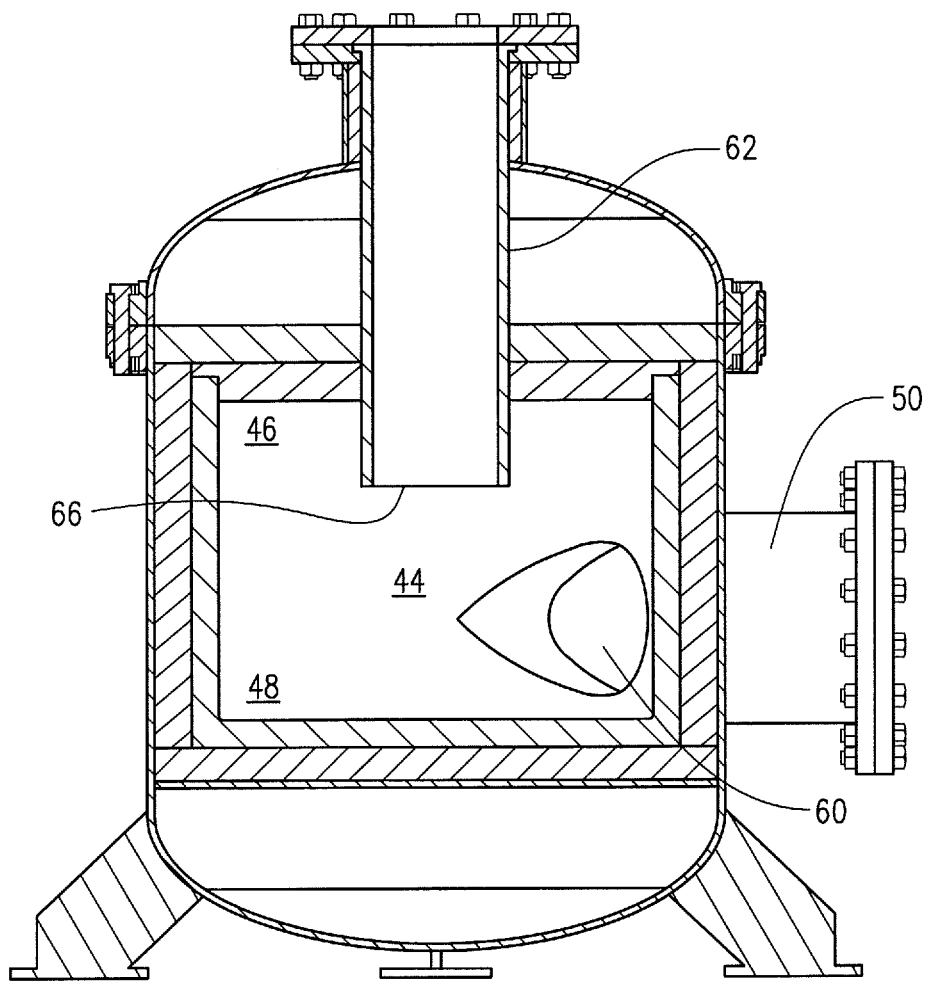
FIG. 2E is a partial sectional view of the centrifugal aluminum chloride generator illustrated by FIG. 1 with a bottom inlet and a central vortex finder extending a first distance from the top of the generator into the generator.
Figure 3:
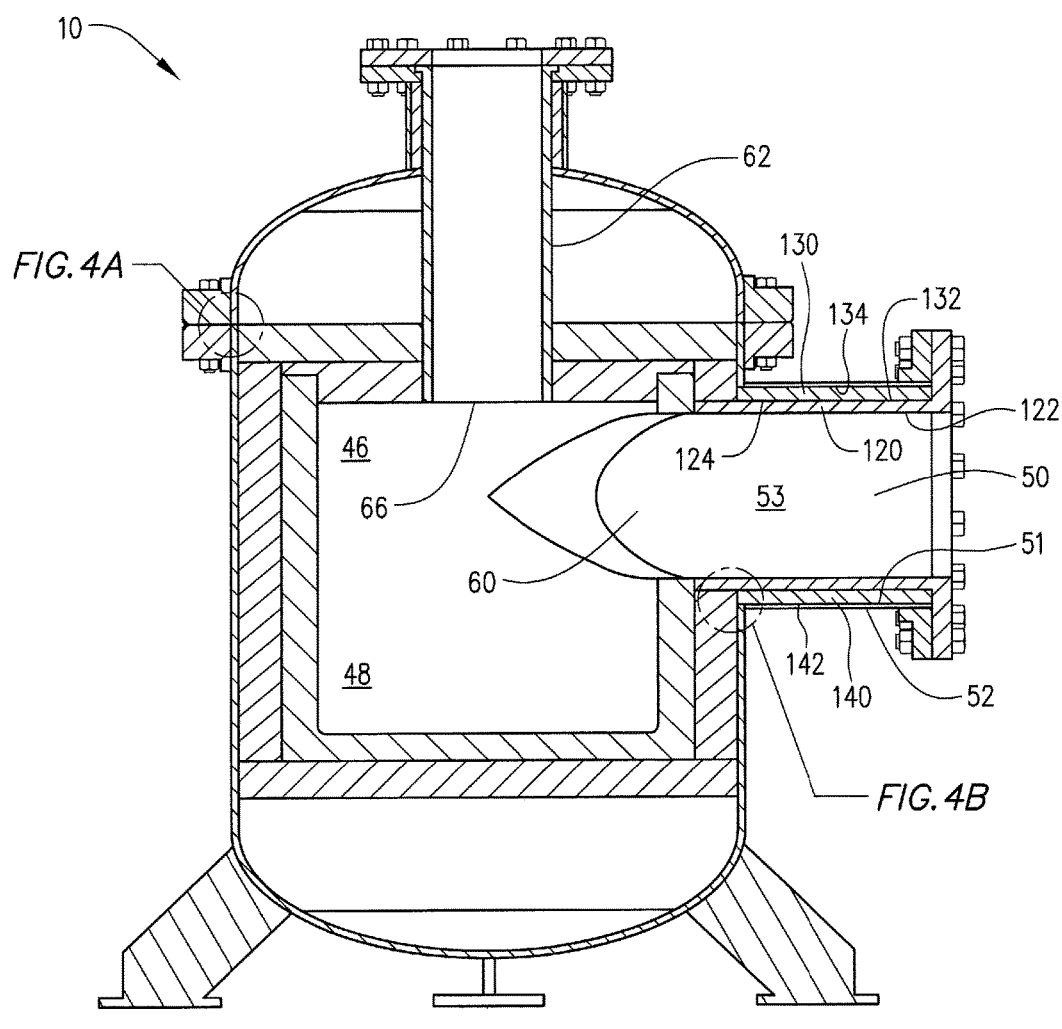
FIG. 3 is another partial sectional view of the centrifugal aluminum chloride generator illustrated by FIG. 2A.

As shown by FIGS. 2A, 2D and 3, the first opening 66 of the reaction product outlet conduit 62 is flush with the top 36 of the reaction chamber 28. As shown by FIGS. 2B, 2C and 2E, in another embodiment, the reaction product outlet conduit 62 extends from the top 36 of the reaction chamber 28 into the interior 44 of the reaction chamber 28 such that the first opening 66 of the reaction product outlet conduit 62 is positioned within the interior 44 of the reaction chamber 28. In this embodiment, for example, the distance that the reaction product outlet conduit 62 extends into the interior 44 of the reaction chamber 28 can be varied to change the position of the first opening 66 within the interior 44 of the reaction chamber 28.

For example, as shown by FIGS. 2B and 2E, the reaction product outlet conduit 62 extends less than half way into the interior 44 of the reaction chamber 28 such that the first opening 66 of the reaction product outlet conduit 62 is positioned within the top half 46 of the interior 44 of the reaction chamber 28. For example, as shown by FIG. 2C, the reaction product outlet conduit 62 extends more than half way into the interior 44 of the reaction chamber 28 such that the first opening 66 of the reaction product outlet conduit 62 is positioned within the bottom half 48 of the interior 44 of the reaction chamber 28. In the same way, the first opening 66 can be placed in other positions within the interior 44 of the reaction chamber 28 as well.

For example, as shown by Example 1 below, it may work best in some cases for the reaction product outlet conduit to extend less than half way into the interior 44 of the reaction chamber 28 such that the first opening 66 of the reaction product outlet conduit 62 is positioned within the top half 46 of the interior 44 of the reaction chamber 28. In fact, in many cases, it may work best for the first opening 66 of the reaction product outlet conduit 62 to be flush with the top 36 of the reaction chamber 28.

The reactor housing 12 is formed of an Inconel alloy or an Inconel alloy clad carbon steel. The reaction chamber 28, the reactant inlet conduit 50 and the reaction product outlet conduit 62 are formed of silicon carbide or another corrosion-resistant ceramic material.

The corrosion-resistant liners 84, 140 and 170 are each formed of a material that is resistant to corrosion by the reactants added to the reaction chamber and the reaction products formed therein. For example, the corrosion-resistant liners 84, 140 and 170 can each be formed of silicon carbide or another corrosion-resistant ceramic material.

The insulation layers 100, 130 and 160 are each formed of a material that can help retain the heat that is generated by the reaction in the reaction chamber 28. For example, the insulation layers 100, 130 and 160 can each be formed of a refractory tile or firebrick.

The refractory linings 92, 120, and 150 prevent wear and tear of the components of the metal chloride generator 10 due to particle abrasion and corrosion. The refractory linings 92, 120, and 150 can serve other functions as well. For example, metal (for example, aluminum) particles added to the reaction chamber 28 tend to have a metal oxide layer (for example, an aluminum oxide layer in the case of aluminum) on their surfaces. In order to sustain the metal chloride reaction consistently, it can be necessary to break up such metal oxide layers on the metal particles.

For example, one or more (for example, all) of the inside surfaces 94, 122, and 152 of the refractory linings 92, 120 and 150 facing the interiors 44, 53 and 65 of the reaction chamber 28, reactant inlet conduit 50, and reaction product outlet conduit 62, respectively, can have a texture that is rough enough to break up metal oxide layers on the metal particles. The texture of the surfaces can provide the scouring necessary to break up any metal oxide layers on the metal particles, thereby eliminating the need for sand or another scouring agent in the reaction chamber 28.

For example, one or more (for example, all) of the inside surfaces 94, 122, and 152 of the refractory linings 92, 120 and 150 can have a surface roughness in the range of from about 0.01 μm to about 1000 μm. For example, one or more (for example, all) of the inside surfaces 94, 122, and 152 of the refractory linings 92, 120 and 150 can have a surface roughness in the range of from about 0.96 μm to about 9.79 μm. As used herein and in the appended claims, the "surface roughness" of a surface means the length of the deviations in surface in the direction of the normal vector of the surface, as measured by a Mahr Pocket Surf PS1 surface tester. The larger the deviations, the rougher the surface.

For example, the refractory linings 92, 120, and 150 can be formed of a ceramic material. For example, the refractory linings 92, 120, and 150 can be formed of a silicon carbide (SiC) ceramic material. For example, ceramic materials such as a silicon carbide material not only effectively protect the inside surfaces 94, 122, and 152 of the reaction chamber 28, reactant inlet conduit 50 and reaction product outlet conduit 62 from wear and tear, but also have sufficient textures to provide the scouring necessary to break the metal oxide layer on the metal particles. An example of such a material that is commercially available is Altron™ Alumina Bonded Silicon Carbide, sold by Blasch Precision Ceramics, Inc. of Albany, N.Y.

As described below, the metal chloride generator 10 can be incorporated into a production line for producing titanium dioxide. The generated metal chloride can be mixed into the full flow of the titanium halide vapor or other titanium halide line feeding the oxidizer in order to help disperse the high heat of the metal chloride coming out of the aluminum chloride generator 10. For example, the titanium halide vapor can be run through the metal chloride generator 10 during operation of the generator.

The cylindrical reaction chamber 28 operates as a centrifuge reactor. A chlorine gas stream is fed into the first opening 54 of the reactant inlet conduit 50. For example, a feed apparatus (not shown) can be used to drop metal particles (for example, aluminum pellets) into the chlorine gas stream in the reactor inlet conduit 50. For example, the feed apparatus can be a double valve arrangement, a dump valve, a rotary valve, a pressurized feeder or a screw feeder. The velocity of the chlorine gas stream carries the pellets into the reaction chamber 28. For example, the reaction components are tangentially injected through the first opening 54 of the reactant inlet conduit 50 into the interior 24 of the reaction chamber 28 at a velocity and pressure sufficient to cause the reaction components to swirl around the inside surface 32 of the sidewall 40 of the reaction chamber and form a vortex in the reaction chamber.

The second opening 60 of the reactant inlet conduit 50 helps form the vortex of reaction components in the interior 24 of the reaction chamber 28. The shape, configuration and position of the second opening 60 of the reactant inlet conduit 50 causes the reactants to be tangentially injected (with respect to the surface 32) into the reaction chamber and travel along the cylindrical wall when the reactants are injected into the reaction chamber at a sufficient velocity and pressure. For example, as shown by FIG. 2A, the second opening 60 of the reactant inlet conduit 50 is a cyclonic inlet that tapers toward the interior 44 of the reaction chamber 28 and is configured to tangentially inject the reactants with respect to the inside surface 32 of the cylindrical sidewall 40 of the reaction chamber. The second opening is flush with the inside surface 32 of the cylindrical sidewall to facilitate the tangential injection.

For example, in order to assure that the metal particles added to the reaction chamber 28 of the generator 10 keep circulating in the reaction chamber, the reaction components can be injected through the first opening 54 of the reactant inlet conduit 50 into the interior 24 of the reaction chamber 28 at a minimum injection velocity (a "minimum inlet velocity"). The minimum injection velocity is a function of the geometry of the reactor. For example, the minimum inlet velocity can be in the range of about 25 ft/sec to about 100 ft/sec. Due to flow effects, the aluminum chloride that is formed during the process (together with titanium halide, for example, if titanium halide is introduced into the reactor to absorb heat) works its way down in the reaction chamber 28 and outwardly from the inside surface 32 of the reaction chamber 28 into a vortex in the reactor created by the centrifugal action. Once in the vortex, the aluminum chloride vapors (and titanium halide vapors, if present) make their way into the reaction product outlet conduit 62 and exit the reaction chamber 28 and generator 10.

The centrifugal action created by the vortex in the reaction chamber 28 applies centrifugal forces (for example, g-forces) to the metal particles which holds smaller metal particles in the reaction chamber 28 thereby making the reaction process more efficient and allowing a smaller reactor to be used. For example, aluminum reacts with chlorine gas in the reaction chamber 28 to form aluminum chloride vapor in accordance with the following reaction:

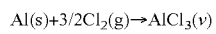

For example, the temperature in the reaction chamber 28 can be kept above the low temperature extreme of about 300° C., where the temperature may not be sufficient to kick off the reaction, and below the high temperature extreme of the melting point of the metal (for example, 660° C., which is the melting point of aluminum). The reaction between metal and chlorine in the reaction chamber is very exothermic. For example, when the generator 10 is used on a chloride process for manufacturing titanium dioxide, combining all or a portion of the titanium halide gas stream with the chlorine gas stream fed into the reaction chamber 28 can help control the temperature of the reaction. The gaseous titanium halide stream absorbs heat thereby helping to control the temperature of the overall reactant stream.

By extending from the top 36 of the reaction chamber 28 into the interior 44 of the reaction chamber 28, the reaction product outlet conduit 62 serves as a vortex finder, that is, the reaction product outlet conduit 62 serves to position the first opening 66 in the vortex formed in the reaction chamber 28. By varying the distance in which the reaction product outlet conduit 62 extends into the interior 44 of the reaction chamber 28 to change the position of the first opening 66 within the interior 44 of the reaction chamber 28, the optimum position of the vortex finder can be determined. As shown by Example 1, in some cases, the process works better with no vortex finder at all, that is, when the first opening 66 of the reaction product outlet conduit 62 is flush with the top 36 of the reaction chamber 28.

The inherent surface roughness of the refractory linings 92, 120 and 150 functions to scour aluminum particles to remove aluminum oxide from the surfaces thereof. This eliminates the need for sand or other scour media in the reaction chamber 28 and the associated wear problems potentially caused thereby.

The entire process, including the generation of metal chloride in the generator 10, is carried out on a continuous basis. The amount of metal chloride from the generator 10 that is added to the oxidizer 250 with the titanium halide is sufficient to cause metal oxide to be incorporated into the lattice structure of the titanium dioxide formed in the oxidizer. For example, metal chloride from the generator 10 can be added to the oxidizer 250 in an amount in the range of from about 0.5% to about 1.5% by weight, based on the weight of the titanium dioxide that is formed.

For example, aluminum, boron, zirconium, silicon, and phosphorous can be reacted with chlorine gas in the metal chloride generator 10 to form aluminum chloride ($AlCl_3$), boron trichloride ($BCl_3$), zirconium chloride ($ZrCl_4$), silicon chloride ($SiCl_4$) and phosphorus chloride ($PCl_3$), respectively. Various mixtures or alloys of the above metals including aluminum-silicon alloys, aluminum-phosphorus alloys, aluminum-boron alloys, aluminum-zirconium alloys and combinations thereof can also be reacted with chlorine in the metal chloride generator 10 to form mixed metal chloride precursor compounds.

Figure 8:
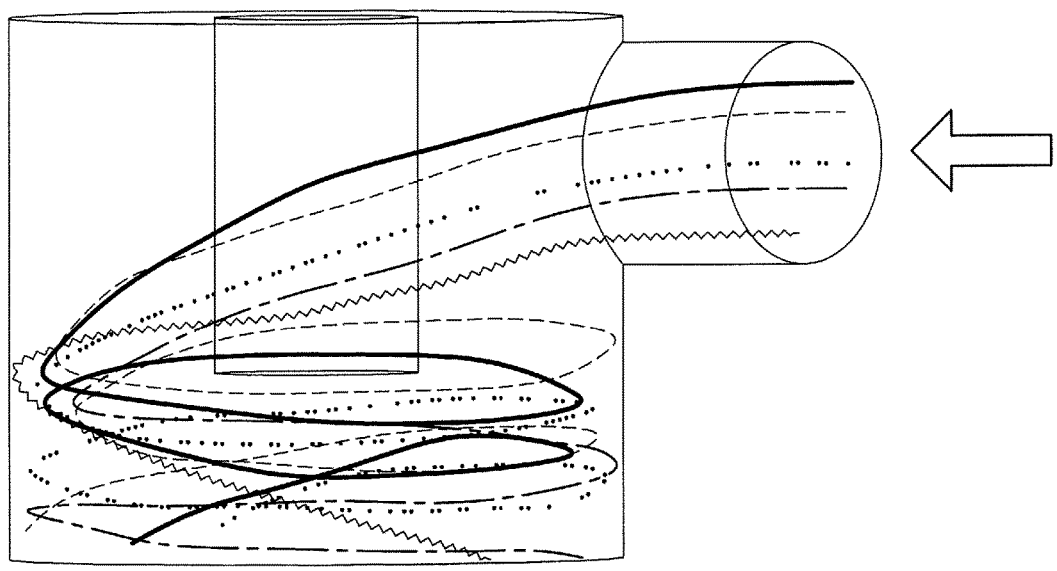

FIGS. 5-8 illustrate the results of a computational fluid dynamics (CFD) analysis carried out with respect to the metal chloride generator 10, based on the reaction of chlorine gas and aluminum pellets to form aluminum chloride in the generator 10. This analysis shows, for example, the top entry configuration of the generator 10 (FIG. 5), the likely flow pattern and reactant velocity in the generator 10 (FIG. 6), the pressure drop in the generator 10 (FIG. 7) and the particle retention in the generator 10 (FIG. 8). The analysis is based on a reaction chamber 28 that has an internal diameter of 32 inches, an internal height of 28 inches and an external height of 31 inches, a reactant inlet conduit 50 that has a 12 inch nominal inner diameter, and a reaction product outlet conduit 62 that has a 9.2 inch inner diameter. The velocity associated with the reactant inlet conduit 50 is 86 ft/sec. The pressure drop in the reaction chamber 28 is 0.6 psig. All particles over 100 µm are retained in the reaction chamber 28.

As indicated by FIG. 7, for example, the pressure drop within the reaction chamber 28 is fairly small, less than 1 psig. In comparison, a traditional fluid bed reactor requires a sufficient pressure drop across a flow distributor. For example, the pressure drop across the bed of a fluid bed reactor can be 5 psi.

As indicated by FIG. 8, for example, the generator 10 will retain aluminum particles as small as 100 µm, which is well below the terminal velocity size for a fluid bed generator (approximately 600 µm).

For example, in one embodiment, the aluminum chloride generator has the following design parameters: (a) the tangential fluid flow velocity through the reactant inlet conduit 50 is between about 50 ft/sec to about 200 ft/sec.; (b) the ratio between the inner diameter of the reaction chamber 28 to the inner diameter of the reactant inlet conduit 50 is between 2:1 to 4:1; (c) the ratio between the height of the reaction chamber 28 to the inner diameter of the reactant inlet conduit 50 is between 2:1 to 10:1; and (d) the ratio between the diameter of the reaction product outlet conduit 62 to the diameter of the reactant inlet conduit 50 is between 1:1 to 2:1. With these design parameters, a well-developed centrifugal flow pattern is achieved resulting in a good pressure drop and good particle retention, and allowing a relatively small reactor to be used. The aluminum chloride generator 10 is compatible with an oxidizer that is capable of producing 7.5 metric tons of titanium dioxide per hour.

Thus, the metal chloride generator 10 disclosed herein has a relatively compact design when compared to conventional fluid bed metal chloride generators and can be used as an alternative thereto. A traditional fluid bed aluminum chloride generator is approximately 16 feet high and 3.3 feet in diameter. The metal chloride generator 10 can reduce this size by 90% or more. This not only reduces the capital expenses associates with generating aluminum chloride, but also reduces the footprint and allows the generator 10 to be relatively easily retrofitted into an existing plant. The metal chloride generator and processes disclosed herein can result in a decrease in the capital expenditures and operating expenditures associated with the manufacture of titanium dioxide pigments. The metal chloride generator can be retrofitted into existing operations including existing production lines for producing titanium dioxide.

Figure 9:
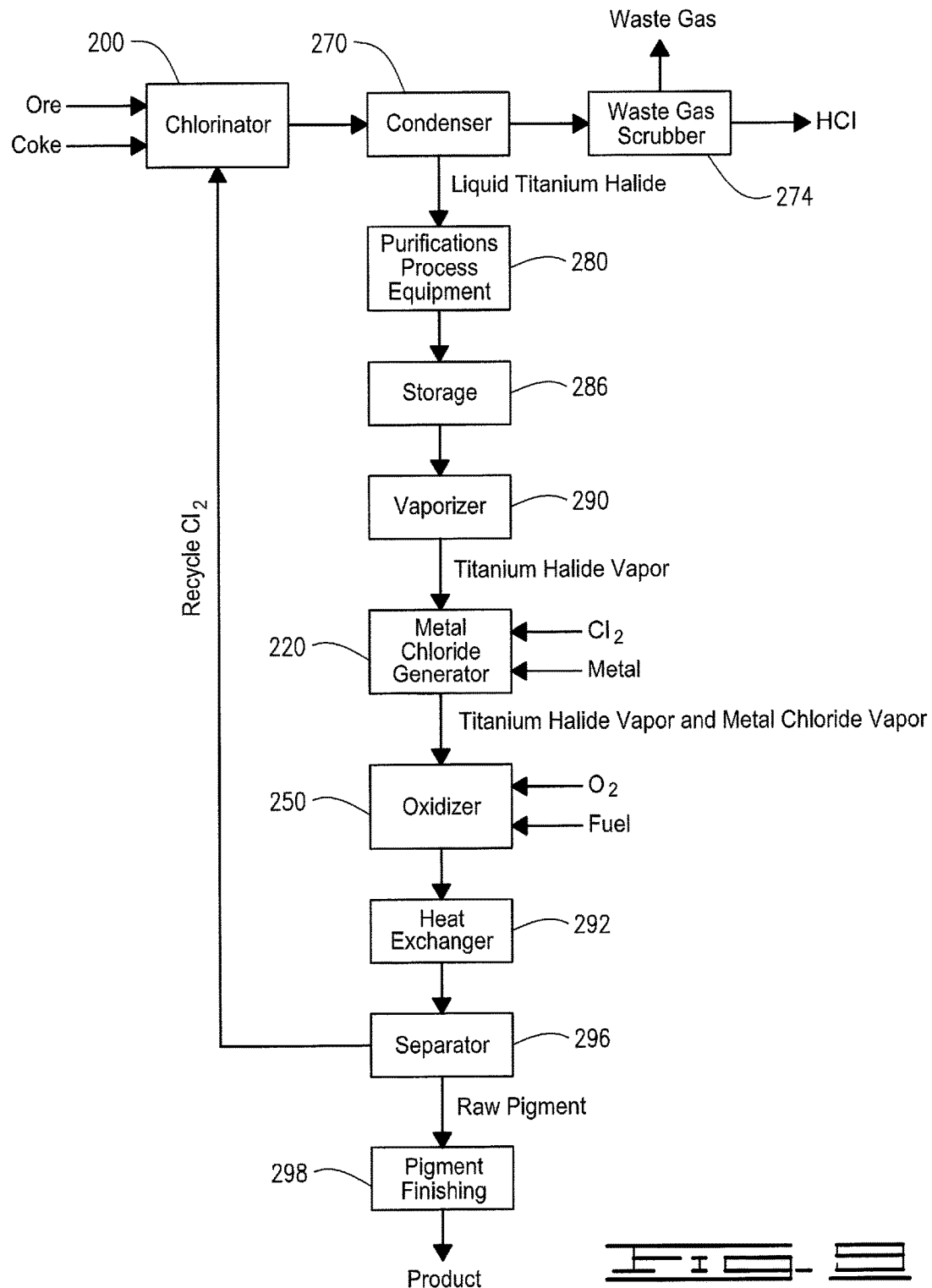
FIG. 9 is a schematic diagram illustrating one embodiment of the process for manufacturing titanium dioxide disclosed herein.

Referring now to FIG. 9, with reference to FIGS. 1-4, a first embodiment of the process for manufacturing titanium dioxide disclosed herein will be described. In this embodiment, the process is a chloride process for manufacturing titanium dioxide, comprising:
 a. introducing titanium dioxide ore, a carbon source and chlorine into a chlorinator 200;
 b. operating the chlorinator 200 under conditions sufficient to cause titanium dioxide ore, the carbon source and chlorine in the chlorinator 200 to react to form titanium halide ($TiCl_4$);
 c. introducing metal particles and chlorine into a metal chloride generator 220, wherein the metal chloride generator 220 is a metal chloride centrifugal reactor;
 d. operating the metal chloride generator 220 under conditions sufficient to cause metal particles and chlorine in the generator to be brought into contact with one another and react using centrifugal force to form metal chloride;
 e. introducing titanium halide formed in the chlorinator 200, metal chloride formed in the metal chloride generator 220 and oxygen into an oxidizer 250;
 f. operating the oxidizer 250 under conditions sufficient to oxidize titanium halide and metal chloride in the oxidizer 250 to form titanium dioxide particles having a metal oxide incorporated into their crystalline lattice structure and gaseous reaction products; and
 g. recovering titanium dioxide particles formed in the oxidizer 250.

For example, the titanium dioxide ore introduced into the chlorinator 200 can be rutile, synthetic rutile, high-grade ilmenite, or titanium slag. For example, the titanium dioxide ore introduced into the chlorinator 200 can be a 50:50 blend of synthetic rutile and titanium slag.

Chlorinators useful for facilitating the reaction of titanium dioxide ore, a carbon source and gaseous chlorine ($Cl_2$) to form titanium tetrachloride in a chloride process for manufacturing titanium dioxide are known to those skilled in the art with the benefit of this disclosure. The titanium dioxide ore and carbon source can be conducted to and introduced into the chlorinator from one or more sources thereof (not shown) as known to those skilled in the art. As shown by FIG. 9, the chlorine conducted to and introduced into the chlorinator can be chlorine gas that is recycled from a subsequent reaction step. Alternatively, the chlorine gas can come from another source. As used herein and in the appended claims, a carbon source means one or more compounds capable of providing the carbon necessary to react with titanium dioxide and chlorine to form titanium tetrachloride. For example, the carbon source can be coke.

As understood by those skilled in the art with the benefit of this disclosure, the chlorinator operates as a fluidized bed reactor. The chlorinator 200 is operated under conditions sufficient to cause titanium dioxide ore, the carbon source and chlorine in the chlorinator to react to form titanium tetrachloride. For example, the chlorinator 200 is operated at a temperature in the range of from about 900° C. to about 1000° C. The main chemical reactions that occur in the chlorinator 200 are exemplified by reaction (1):

$$TiO_2+C+2Cl_2 \rightarrow TiCl_4+CO+CO_2 \quad (1)$$

The gaseous titanium tetrachloride and other gaseous reaction products formed in the chlorinator 200 are conducted to and introduced into a condenser 270. Condensers useful for condensing gaseous titanium tetrachloride to liquid titanium tetrachloride (for example, by cooling the gaseous titanium halide) are known to those skilled in the art with the benefit of this disclosure. As understood by those skilled in the art with the benefit of this disclosure, the condenser 270 is operated under conditions sufficient to condense gaseous titanium tetrachloride to liquid titanium tetrachloride.

Waste gas in the condenser 270 is conducted to and introduced into a waste gas scrubber 274, where it is scrubbed and discharged and conducted to another location for further processing or disposal. Hydrochloric acid (HCl) formed by the scrubbing process is discharged from the waste gas scrubber 274 and conducted to another location for storage or further processing.

Liquid titanium tetrachloride formed in the condenser 270 is conducted from the condenser 270 and introduced into purification process equipment 280 that can be used to purify the titanium tetrachloride. For example, the liquid titanium tetrachloride can be purified by treating the titanium tetrachloride with oils, distilling the titanium tetrachloride and/or filtering the titanium tetrachloride. The process equipment 280 includes the necessary equipment to carry out one or more of these steps.

The purified liquid titanium halide is then conducted from the purification process equipment 280 and introduced into a storage container 286. The purpose of the storage container 286 is to assure that a supply of purified titanium tetrachloride is continuously available for the subsequent process steps.

Liquid titanium tetrachloride is then conducted from the storage container 286 and introduced into a vaporizer 290. Vaporizers useful for vaporizing liquid titanium tetrachloride to form gaseous titanium tetrachloride are known to those skilled in the art with the benefit of this disclosure. As understood by those skilled in the art with the benefit of this disclosure, the vaporizer 290 is operated under conditions sufficient to vaporize liquid titanium tetrachloride to form gaseous titanium tetrachloride. Gaseous titanium tetrachloride in the vaporizer 290 is discharged from the vaporizer 290 and conducted to the metal chloride generator 220.

For example, the metal chloride centrifugal reactor 220 can be the metal chloride generator 10 described above and shown by FIGS. 1-8. The remainder of this description of the process disclosed herein is directed to the process wherein the metal chloride centrifugal reactor 220 is the metal chloride generator 10 described above and shown by FIGS. 1-8.

Metal particles and chlorine are conducted to and introduced into the metal chloride generator 10 from sources thereof (not shown). For example, as shown by FIG. 9, all or a portion of the titanium tetrachloride vapor formed in the vaporizer 112 can also conducted to the metal chloride generator 10 to help dissipate the heat of the reaction in the metal chloride generator 10.

The titanium tetrachloride vapor, metal particles and chlorine are introduced into the metal chloride generator 10 by feeding the metal particles and chlorine into the reactant inlet conduit 50 of the metal chloride generator 10 through the first opening 54 of the reactant inlet conduit 50 and discharging the metal particles and chlorine into the interior 44 of the reaction chamber 28 of the generator 10 through the second opening 60 of the reactant inlet conduit 50. The type of metal particles added to the metal chloride generator 10 will depend on the type of metal chloride to be produced by the metal chloride generator 10. For example, the metal particles introduced into the metal chloride generator can be formed of a metal selected from the group of aluminum, boron, zirconium, silicon and phosphorus. Particles (for example, pellets) formed of mixtures or alloys of the above metals including aluminum-silicon alloys, aluminum-phosphorus alloys, aluminum-boron alloys, aluminum-zirconium alloys and combinations thereof can also be reacted with chlorine in the metal chloride generator to form mixed metal chloride precursor compounds.

The size of the metal particles can vary. For example, the approximate diameter of the metal particles can be $\frac{1}{4}^{th}$ or $\frac{3}{8}^{th}$ of an inch. For example, the metal particles introduced into the metal chloride generator 10 can be formed of aluminum so that aluminum chloride ($AlCl_3$) is generated in the generator 10. Aluminum chloride is known for its ability to promote rutilization of and enhance the durability of titanium dioxide pigments. Aluminum pellets having a $\frac{1}{4}^{th}$ inch or $\frac{3}{8}^{th}$ inch diameter are commercially available. Chopped aluminum pellets and aluminum grains having a size of 1-4 mm are also commercially available.

The reaction of chlorine and metal particles such as aluminum particles to form a metal chloride such as aluminum chloride in the metal chloride generator 10 is very exothermic. By running the titanium tetrachloride vapor from the vaporizer 290 or other process equipment through the generator 10, some of the heat generated to produce metal chloride can be absorbed. For example, the reaction of aluminum and chlorine is so exothermic that at typical addition levels, virtually the entire titanium tetrachloride vapor stream is run through the metal chloride generator 10 to serve as a heat sink for the process to keep the reaction temperature under control as dictated by the melting point of aluminum.

The metal chloride generator 10 is operated under conditions sufficient to cause metal particles and chlorine in the generator to be brought into contact with one another and react to form metal chloride. The centrifugal forces allow the solid metal particles and chlorine gas to react while preventing unreacted metal particles from exiting the reactor as blow over. For example, the metal chloride formed in the metal chloride generator can be selected from the group of aluminum chloride ($AlCl_3$), boron trichloride ($BCl_3$), zirconium chloride ($ZrCl_4$), silicon chloride ($SiCl_4$) and phosphorus chloride ($PCl_3$), For example, the metal chloride formed the metal chloride generator can be aluminum chloride.

A mixed vapor stream including metal chloride formed in the generator 10 and titanium tetrachloride vapor in the generator flows through the reaction product outlet conduit 62 of the generator through the first opening 66 thereof, and is discharged from the reaction product outlet conduit 62 through the second opening 68 thereof to a location 70 outside of the reactor housing 12. As shown by FIG. 9A, for example, the mixed vapor stream including metal chloride and titanium tetrachloride are discharged from the generator 10 and conducted to and introduced into the oxidizer 250.

Oxidizers useful for facilitating the oxidation of a titanium halide to form a titanium dioxide in a process for manufacturing titanium dioxide are known to those skilled in the art with the benefit of this disclosure. In addition to the mixed vapor stream including metal chloride and titanium tetrachloride that is introduced into the oxidizer 250 from the metal chloride generator 10, oxidizing gas and, optionally, supplemental fuel, are also conducted to and introduced into the oxidizer 250. For example, the supplemental fuel can be propane. The supplemental fuel is added to the oxidizer in order to provide heat to help sustain the oxidation reaction.

Metal chloride from the metal chloride generator 10 can be conducted to and introduced into the oxidizer 250 in a predetermined amount that is sufficient to promote rutilization of the titanium dioxide. The amount of metal oxide (for example, alumina) needed to promote rutilization of the titanium dioxide will vary depending on numerous factors known to those skilled in the art with the benefit of this disclosure. For example, generally, the amount of metal oxide required to promote rutilization of the titanium dioxide is in the range of from about 0.3% to about 1.5% by weight based on the weight of the titanium dioxide particles being produced. For example, a typical amount of alumina introduced to the oxidizer 250 is 1.0% by weight based on the weight of the titanium dioxide being produced.

The oxidizing gas conducted to and introduced into the oxidizer 250 can be molecular oxygen ($O_2$). Alternatively, the oxidizing gas can be an oxygen-containing gas such as oxygen in a mixture with air (oxygen enriched air). The particular oxidizing gas employed will depend on a number of factors including the size of the reaction zone within the oxidization reactor, the degree to which the titanium halide and oxygen-containing gas reactants are preheated, the extent to which the surface of the reaction zone is cooled and the throughput rate of the reactants in the reaction zone. While the exact amounts of the titanium tetrachloride and oxidizing gas reactants employed can vary widely and are not particularly critical, it is important that the oxidizing gas reactant be present in an amount at least sufficient to provide for a stoichiometric reaction with the titanium tetrachloride. Generally, the amount of the oxidizing gas reactant employed will be an amount in excess of that required for a stoichiometric reaction with the titanium halide reactant, for example, from about 5% to about 25% in excess of that required for a stoichiometric reaction.

An example of another component that can be advantageously introduced into the oxidizer is a scouring agent. The scouring agent functions to clean the walls of the reactor and prevent fouling thereof. Examples of scouring agents which can be used include, but are not limited to, sand, mixtures of titanium dioxide and water which are pelletized, dried and sintered, compressed titanium dioxide, rock salt, fused alumina, titanium dioxide and salt mixtures and the like. The molecular oxygen or other oxidizing gas, supplemental fuel (if used) and scouring agent (if used) are conducted to the oxidizer 250 from sources thereof (not shown).

As known to those skilled in the art with the benefit of this disclosure, the oxidizer 250 is operated under conditions sufficient to oxidize titanium tetrachloride and metal chloride in the vapor phase to form titanium dioxide particles having a metal oxide incorporated in their crystalline lattice structures, and gaseous reaction products. For example, the reaction is carried out at a temperature of at least 700° C. For example, the reaction can be carried out at a temperature in the range of from about 2000° C. to about 2800° C. Titanium dioxide particles having a desired particle size can be produced. For example, the oxidation of titanium tetrachloride to form particulate solid titanium dioxide and gaseous reaction products is exemplified by reaction (2) below:

$$TiCl_4 + O_2 \rightarrow TiO_2 + 2Cl_2 \quad (2)$$

The metal chloride is also oxidized in the oxidizer 250 to form a metal oxide, which is incorporated into the lattice structure of the titanium dioxide. For example, aluminum chloride is oxidized in the oxidizer to form aluminum oxide or alumina ($Al_2O_3$). The amount of metal oxide incorporated into the lattice structure of the titanium dioxide is typically in the range of from about 0.5% to about 1.5% by weight based on the weight of the titanium dioxide. Steps can be taken to control the particle size of the titanium dioxide particles.

Prior to being introduced into the oxidizer 250, the titanium tetrachloride and molecular oxygen or other oxidizing gas reactant streams are typically preheated, for example, in shell and tube type preheaters or a superheater (not shown). For example, the titanium tetrachloride reactant stream can be preheated to a temperature in the range of from about 650° F. to about 1800° F. (for example, to a temperature in the range of from about 675° F. to about 750° F.). The molecular oxygen or other oxidizing gas stream can be preheated to a temperature in the range of from about 750° F. to about 3400° F. (for example, to a temperature in the range of from about 1740° F. to about 1930° F.). If the titanium tetrachloride vapor stream is first run through the metal chloride generator 10, it may not need to be preheated.

The preheated titanium tetrachloride and oxidizing gas streams are charged to and introduced into the oxidizer 250 at high flow rates. The pressure at which the oxidation reaction is carried out can vary widely, for example from about 3 psig to about 50 psig. For example, at a pressure of 1 atmosphere (absolute), the oxidation reaction temperature is typically in the range of from about 2300° F. to about 2500° F.

Upon discharge from the oxidizer 250, the titanium dioxide particles and gaseous reaction products are conducted to and introduced into a heat exchanger 292 (for example, a tubular heat exchanger) where they are cooled by heat exchange with a cooling medium (such as cooling water) to a temperature of about 1300° F. A scouring agent can also be injected into the heat exchanger to remove deposits of titanium dioxide and other materials from the inside surfaces of the heat exchanger. The same types of scouring agents that are used in the oxidizer 250 can be used in the heat exchanger 292.

After passing through the heat exchanger 292, the cooled titanium dioxide particles and gaseous reaction products are conducted to a gas solid separator 296. In the separator 296, the particulate solid titanium dioxide is separated from the gaseous reaction products and scouring agent (if used). The separated gaseous reaction products can be recycled for use in the process. For example, as shown by FIG. 9, the chlorine gas is recycled from the separator 296 to the chlorinator 200. The majority of the chlorine used in the process can be recovered.

The particulate titanium dioxide separated in the separator 296 is then conducted to and introduced into pigment finishing process equipment 298. For example, the titanium dioxide particles can be subject to various surface treatments, milled and dried. For example, depending on the anticipated end use application, the finishing process typically entails coating the titanium dioxide particles with one or more metal oxides such as alumina and silica to enhance the light scattering efficiency and durability of the pigment and impart other desired properties and characteristics thereto. The process equipment 298 includes the necessary equipment to carry out one or more of these steps.

The sequence of the various process steps shown by FIG. 9 can be varied. For example, metal chloride formed in the generator 10 can be mixed with purified titanium halide from the process equipment 280. The mixture of metal chloride and purified titanium halide can then be vaporized in the vaporizer 290, preheated, and conducted to the oxidation reactor 250. The mixture can be preheated either before or after it is vaporized. In this embodiment, the metal chloride generator 10 is positioned upstream in the process.

As shown by FIG. 10, in a second embodiment, the process for manufacturing titanium dioxide disclosed herein comprises:

a. introducing metal particles and chlorine into a metal chloride generator 220, wherein the metal chloride generator 220 is a metal chloride centrifugal reactor;
 b. operating the metal chloride generator under conditions sufficient to cause metal particles and chlorine in the generator to be brought into contact with one another and react using centrifugal force to form metal chloride;
 c. introducing titanium halide, metal chloride formed in the metal chloride generator 220 and oxygen into an oxidizer 250;
 d. operating the oxidizer 250 under conditions sufficient to oxidize titanium halide and metal chloride in the oxidizer 250 to form titanium dioxide particles having a metal oxide incorporated into their crystalline lattice structure and gaseous reaction products; and e. recovering titanium dioxide particles formed in the oxidizer 250.

In this embodiment, steps a.-e. above are carried out in the same manner as steps c.-g., as described above in connection with the first embodiment of the process, except in addition to titanium tetrachloride, other titanium halides can be oxidized with the metal chloride to form the titanium dioxide particles and otherwise used in the process. Also, the titanium halide vapor can come from any source. Subject to these exceptions, the description of steps c.-g. above, including the description of FIG. 9 as it relates to steps c.-g. and the related, optional and other steps of the process that are described above in connection with steps c.-g., the first embodiment, is incorporated into this discussion of the second embodiment of the process disclosed herein.

For example, the metal chloride centrifugal reactor 220 can be the metal chloride generator 10 described above and shown by FIGS. 1-8. The halogen gas (which can be chlorine gas) separated from the titanium dioxide particles in the separator 296 can be recycled for use in a process used to form the titanium halide vapor.

The titanium halide vapor added to oxidizer 250 (either directly or from the metal chloride generator 10) can be any of the known halides of titanium, including titanium tetrachloride, titanium tetrabromide, titanium tetraiodide and titanium tetrafluoride. Preferably, the titanium halide reactant is titanium tetrachloride.

For example, the process is carried out on a continuous basis.

It should be noted that the description herein of the process of this disclosure (both the first and second embodiment of the process disclosed herein) illustrates use of the metal chloride generator 10 in situ in a process for manufacturing titanium dioxide. However, the description herein also illustrates use of the metal chloride generator 10 to generate aluminum chloride in other types of processes as well. The metal chloride generator 10 can be used to form various metal chlorides including aluminum chloride, boron trichloride, zirconium chloride, silicon chloride, phosphorus chloride and mixtures of such compounds. Although the heat of the reaction may vary with the reactants, the basic process for generating all of these compounds is the same.

EXAMPLE

The following example illustrates specific embodiments consistent with the present disclosure but do not limit the scope of the disclosure or the appended claims. Concentrations and percentages are by weight unless otherwise indicated.

Example 1

Cold flow testing of a full scale model of the metal chloride generator 10 described above was tested for its ability to produce aluminum chloride for use in a continuous chloride process for the manufacture of titanium dioxide. For example, tests were carried out on an embodiment of the model wherein the second opening 60 of the reactant inlet conduit 50 opened into the top half 46 of the interior 44 of the reaction chamber 28, as shown by FIGS. 1, 2A, 2B, 2C and 3. Tests were also carried out on an embodiment of the model wherein the second opening 60 of the reactant inlet conduit 50 opened into the bottom half 48 of the interior 44 of the reaction chamber 28, as shown by FIGS. 2D and 2E.

Also, in carrying out the tests, the distance that the reaction product outlet conduit 62 extended into the interior 44 of the reaction chamber 28, was varied to change the position of the first opening 66 within the interior 44 of the reaction chamber 28. For example, in some tests, the first opening 66 of the reaction product outlet conduit 62 was flush with the top 36 of the reaction chamber 28 as shown by FIGS. 2A, 2D and 3 (in other words, the reaction product outlet conduit 62 did not extend into the interior 44 of the reaction chamber 28). In other tests, the reaction product outlet conduit 62 extended less than half way into the interior 44 of the reaction chamber 28 such that the first opening 66 of the reaction product outlet conduit 62 was positioned within the top half 46 of the interior 44 of the reaction chamber 28, as shown by FIGS. 2B and 2E. In yet other tests, the reaction product outlet conduit 62 extended more than half way into the interior 44 of the reaction chamber 28 such that the first opening 66 of the reaction product outlet conduit 62 was positioned within the bottom half 48 of the interior 44 of the reaction chamber 28, as shown by FIG. 2C.

Overall, the tests were successful. The cold flow testing of the full scale model of the metal chloride generator 10 confirmed that the generator can successfully produce aluminum chloride for use in a continuous chloride process for the manufacture of titanium dioxide. Based on the tests, it was concluded that in some respects, it is better for the second opening 60 of the reactant inlet conduit 50 to open into the top half 46 of the interior 44 of the reaction chamber 28. For example, the gas flow from the second opening 60 into the reaction chamber 28 tended to cause a damming effect for the circulating pellets or other particulates. The impact of such an effect was less by positioning the second opening 60 to open into the top half 46 of the interior 44 of the reaction chamber 28. It was also concluded that it may work best in some cases for the reaction product outlet conduit to extend less than half way into the interior 44 of the reaction chamber 28 such that the first opening 66 of the reaction product outlet conduit 62 is positioned within the top half 46 of the interior 44 of the reaction chamber 28. Extending the reaction product outlet conduit 62 too deep into the reaction chamber 28 tended to cause the metal pellets or other particulates circulating in the reaction chamber to be caught up in the outflow through the outlet conduit 62. In fact, in many cases, it may work best for the first opening 66 of the reaction product outlet conduit 62 to be flush with the top 36 of the reaction chamber 28, that is, for reaction product outlet conduit 62 not to extend into the interior 44 of the reaction chamber 28. In other words, in many cases, it may be best not to have a vortex finder at all.

Therefore, the present disclosure is well adapted to attain the ends and advantages mentioned, as well as those that are inherent therein. The particular embodiments disclosed above are illustrative only, as the present disclosure may be modified and practiced in different, but equivalent, manners apparent to those skilled in the art having the benefit of the teachings herein. Furthermore, no limitations are intended to the details of construction or design herein shown, other than as described in the claims below. It is therefore evident that the particular illustrative examples disclosed above may be altered or modified, and all such variations are considered within the scope and spirit of the present disclosure. While apparatus and methods may be described in terms of "comprising," "containing," "having," or "including" various components or steps, the apparatus and methods can also, in some examples, "consist essentially of" or "consist of" the various components and steps. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the specification.

What is claimed is:

1. A chloride process for manufacturing titanium dioxide, comprising:
    introducing titanium dioxide ore, a carbon source and chlorine into a chlorinator;
    operating said chlorinator under conditions sufficient to cause titanium dioxide ore, said carbon source and chlorine in said chlorinator to react to form titanium tetrachloride;
    introducing metal particles and chlorine into a metal chloride generator, wherein said metal chloride generator is a metal chloride centrifugal reactor;
    operating said metal chloride generator under conditions sufficient to cause metal particles and chlorine in said generator to be brought into contact with one another and react using centrifugal force to form metal chloride;
    introducing titanium tetrachloride formed in said chlorinator, metal chloride formed in said metal chloride generator and oxygen into an oxidizer;
    operating said oxidizer under conditions sufficient to oxidize titanium tetrachloride and metal chloride in said oxidizer to form titanium dioxide particles having a metal oxide incorporated into their crystalline lattice structure; and
    recovering titanium dioxide particles formed in said oxidizer.

2. The process of claim 1, wherein said carbon source is coke.

3. The process of claim 1, wherein said metal chloride centrifugal reactor comprises:
    a reactor housing, said reactor housing including an inside surface, an outside surface, a top portion, a bottom portion, a sidewall connecting said top portion and said bottom portion together, and an interior;
    a cylindrical reaction chamber positioned within said interior of said reactor housing, said reaction chamber including an inside surface, an outside surface, a top, a bottom, a cylindrical side wall connecting said top and said bottom together and an interior, said interior of said reaction chamber having a top half and a bottom half;
    a reactant inlet conduit extending through said sidewall of said reactor housing and said sidewall of said reaction chamber and including an inside surface, an outside surface and an interior, said reactant inlet conduit also including a first opening for receiving at least one reaction component from a location outside of said reactor housing and a second opening for discharging said reaction component into said reaction chamber, said second opening of said reactant inlet conduit being flush with said inside surface of said cylindrical sidewall of said reaction chamber and opening into said reaction chamber; and
    a reaction product outlet conduit extending through said top of said reaction chamber and said top of said reactor housing and including an inside surface, an outside surface and an interior, said reaction product outlet conduit also including a first opening for receiving at least one reaction product from said interior of said reaction chamber and a second opening for discharging said reaction product to a location outside of said reactor housing.

4. The process of claim 3, wherein said second opening of said reactant inlet conduit opens into said top half of said interior of said reaction chamber.

5. The process of claim 3, wherein said first opening of said reaction product outlet conduit is flush with said top of said reaction chamber.

6. The process of claim 3, wherein said reaction product outlet conduit extends from said top of said reaction chamber into said interior of said reaction chamber such that said first opening of said reaction product outlet conduit is positioned within said interior of said reaction chamber.

7. The process of claim 3, wherein said reaction product outlet conduit extends less than half way into said interior of said reaction chamber such that said first opening of said reaction product outlet conduit is positioned within said top half of said interior of said reaction chamber.

8. The process of claim 3, wherein at least one of said reaction chamber, said reactant inlet conduit, and said reaction product outlet conduit includes a refractory lining attached to said inside surface thereof, said refractory lining having an inside surface facing said interior of said reaction chamber, reactant inlet conduit, or reaction product outlet conduit that has a texture rough enough to break up metal oxide layers on said metal particles.

9. The process of claim 8, wherein said inside surface of said refractory lining has a surface roughness in the range of from about 0.01 μm to about 1000 μm.

10. The process of claim 1, wherein said metal introduced into said metal chloride generator is selected from the group of aluminum, boron, zirconium, silicon and phosphorus.

11. The process of claim 1, wherein said metal introduced into said metal chloride generator is aluminum.

12. The process of claim 1, wherein the metal chloride formed in the metal chloride generator is aluminum chloride.

13. The process of claim 1, wherein said metal oxide is incorporated into the crystalline lattice structure of the titanium dioxide particles in an amount in the range of from about 0.5% to about 1.5% by weight based on the weight of the titanium dioxide.

14. A process for manufacturing titanium dioxide, comprising:
    introducing metal particles and chlorine into a metal chloride generator, wherein said metal chloride generator is a metal chloride centrifugal reactor;
    operating said metal chloride generator under conditions sufficient to cause metal particles and chlorine in said generator to be brought into contact with one another and react using centrifugal force to form metal chloride;
    introducing titanium halide formed in said chlorinator, metal chloride formed in said metal chloride generator and oxygen into an oxidizer;
    operating said oxidizer under conditions sufficient to oxidize titanium halide and metal chloride in said oxidizer to form titanium dioxide particles having a metal oxide incorporated their crystalline lattice structure; and
    recovering titanium dioxide particles formed in said oxidizer.

15. The process of claim 14, wherein said metal chloride centrifugal reactor comprises:

a reactor housing, said reactor housing including an inside surface, an outside surface, a top portion, a bottom portion, a sidewall connecting said top portion and said bottom portion together, and an interior;

a cylindrical reaction chamber positioned within said interior of said reactor housing, said reaction chamber including an inside surface, an outside surface, a top, a bottom, a cylindrical side wall connecting said top and said bottom together and an interior, said interior of said reaction chamber having a top half and a bottom half;

a reactant inlet conduit extending through said sidewall of said reactor housing and said sidewall of said reaction chamber, said reactant inlet conduit including a first opening for receiving at least one reaction component from a location outside of said reactor housing and a second opening for discharging said reaction component into said reaction chamber, said second opening of said reactant inlet conduit being flush with said inside surface of said cylindrical sidewall of said reaction chamber and opening into said reaction chamber; and a reaction product outlet conduit extending through said top of said reaction chamber and said top of said reactor housing, said reaction product outlet conduit including a first opening for receiving at least one reaction product from said interior of said reaction chamber and a second opening for discharging at least one reaction product to a location outside of said reactor housing.

16. The process of claim 15, wherein said second opening of said reactant inlet conduit opens into said top half of said interior of said reaction chamber.

17. The process of claim 15, wherein said first opening of said reaction product outlet conduit is flush with said top of said reaction chamber.

18. The process of claim 15, wherein said reaction product outlet conduit extends from said top of said reaction chamber into said interior of said reaction chamber such that said first opening of said reaction product outlet conduit is positioned within said interior of said reaction chamber.

19. The process of claim 15, wherein at least one of said reaction chamber, said reactant inlet conduit, and said reaction product outlet conduit includes a refractory lining attached to said inside surface thereof, said refractory lining having an inside surface facing said interior of said reaction chamber, reactant inlet conduit, or reaction product outlet conduit that has a texture rough enough to break up metal oxide layers on said metal particles.

* * * * *